US010467852B2

(12) United States Patent
Ansari et al.

(10) Patent No.: US 10,467,852 B2
(45) Date of Patent: *Nov. 5, 2019

(54) CONTROLLING CROSS-APPLICATION WAGERING GAME CONTENT

(71) Applicant: Bally Gaming, Inc., Las Vegas, NV (US)

(72) Inventors: Marwan Y. Ansari, Plainfield, IL (US); Robert W. Morgan, III, Villa Park, IL (US); Craig J. Sylla, Round Lake, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/203,147

(22) Filed: Mar. 10, 2014

(65) Prior Publication Data

US 2014/0194190 A1 Jul. 10, 2014

Related U.S. Application Data

(63) Continuation of application No. 12/723,390, filed on Mar. 12, 2010, now Pat. No. 8,668,565.

(Continued)

(51) Int. Cl.
*A63F 9/24* (2006.01)
*A63F 13/00* (2014.01)

(Continued)

(52) U.S. Cl.
CPC ...... *G07F 17/3244* (2013.01); *G07F 17/3223* (2013.01)

(58) Field of Classification Search
CPC .. A63F 13/00; A63F 13/50; A63F 2300/6692; G07F 17/3213

(Continued)

(56) References Cited

U.S. PATENT DOCUMENTS 5,638,505 A * 6/1997 Hemenway ......... G06F 3/04812 715/769
7,753,777 B1 * 7/2010 Giuffria .................. G07F 17/32 463/20

(Continued)

OTHER PUBLICATIONS

"U.S. Appl. No. 12/723,390 Final Office Action", dated Oct. 12, 2012 , 14 pages.

(Continued)

*Primary Examiner* — Kang Hu
*Assistant Examiner* — Jason Pinheiro
(74) *Attorney, Agent, or Firm* — DeLizio Law, PLLC

(57) ABSTRACT

A wagering game system and its operations are described herein. In embodiments, the operations can include determining content from both a first wagering game application and from a second wagering game application. The first and second wagering game applications can be independent wagering game applications played by a player account during a wagering game session. The operations can further include determining some portion of the second content (e.g., three-dimensional objects) that appears to originate from a second-application domain (e.g., from within confines of the second wagering game application), and presenting the portion of the second content within a first-application domain (e.g., within confines of the first wagering game application). In some embodiments, the operations can further include presenting the portion of the second content interacting with the first content within the first-application domain (e.g., presenting three-dimensional objects from the second application interacting with three-dimensional objects of the first application).

20 Claims, 14 Drawing Sheets

Related U.S. Application Data

(60) Provisional application No. 61/159,598, filed on Mar. 12, 2009.

(51) Int. Cl.
*G06F 17/00* (2019.01)
*G06F 19/00* (2018.01)
*G07F 17/32* (2006.01)

(58) Field of Classification Search
USPC .............................................................. 463/16
See application file for complete search history.

(56) References Cited

U.S. PATENT DOCUMENTS

| | | | | |
|---|---|---|---|---|
| 7,948,449 | B2 * | 5/2011 | Yoshinaga | A63F 13/10 345/1.1 |
| 8,602,889 | B2 * | 12/2013 | Maekawa | A63F 13/00 463/32 |
| 8,610,678 | B2 * | 12/2013 | Ikeda | G06F 3/04883 345/1.1 |
| 2002/0022509 | A1 * | 2/2002 | Nicastro, II | G07F 17/32 463/15 |
| 2004/0048646 | A1 * | 3/2004 | Visocnik | 463/16 |
| 2004/0229676 | A1 * | 11/2004 | Duhamel | G07F 17/32 463/16 |
| 2005/0153768 | A1 | 7/2005 | Paulsen | |
| 2005/0239540 | A1 * | 10/2005 | Inamura | G07F 17/34 463/20 |
| 2006/0252486 | A1 * | 11/2006 | Walker | G07F 17/32 463/16 |
| 2009/0164930 | A1 * | 6/2009 | Chen | G06F 3/04883 715/769 |
| 2010/0255900 | A1 | 10/2010 | Ansari et al. | |
| 2011/0287828 | A1 * | 11/2011 | Anderson | G07F 17/32 463/25 |

OTHER PUBLICATIONS

"U.S. Appl. No. 12/723,390 Office Action", dated Apr. 26, 2012 , 16 pages.

* cited by examiner

CONTROLLING CROSS-APPLICATION WAGERING GAME CONTENT

RELATED APPLICATIONS

This application is a Continuation of and claims the priority benefit of U.S. application Ser. No. 12/723,390 filed Mar. 12, 2010 which claims the priority benefit of U.S. Provisional Application Ser. No. 61/159,598 filed Mar. 12, 2009.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2014, WMS Gaming, Inc.

TECHNICAL FIELD

Embodiments of the inventive subject matter relate generally to wagering game systems and networks that, more particularly, control cross-application wagering game content.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
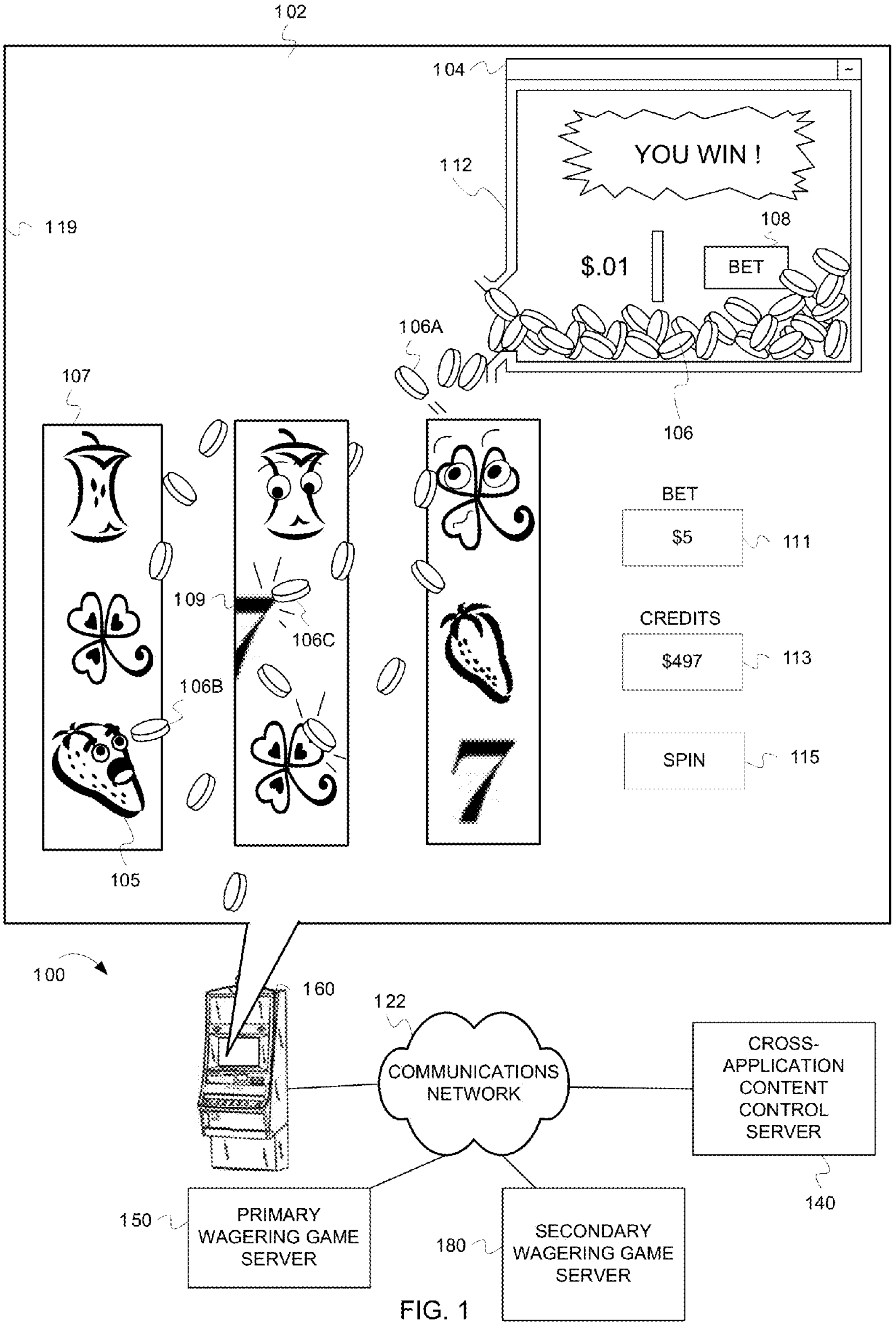
FIG. 1 is an illustration of passing three-dimensional objects beyond the confines of a secondary wagering game application to interact with objects from a primary wagering game application, according to some embodiments.

This description of the embodiments is divided into five sections. The first section provides an introduction to embodiments. The second section describes example operating environments while the third section describes example operations performed by some embodiments. The fourth section describes additional example operating environments, while the fifth section presents some general comments.

Introduction

This section provides an introduction to some embodiments.

There is a continuing need for wagering game machine manufacturers to continuously develop new games and gaming enhancements that will attract frequent play, but that are easy to use, control, and configure. Some gaming enhancements have included providing secondary (e.g., bonus) games that are associated with primary wagering games (e.g., base games). Wagering game developers, however, have faced challenges developing secondary games in conjunction with primary wagering games as the secondary game content (e.g., assets, code, etc.) is developed in conjunction with (e.g., combined with, compiled into, etc.) the primary wagering game's content, thus extending the development cycle of the primary wagering game. Further, when the programming for a secondary game is modified, the potential for affecting the primary wagering game increases, and vice versa, because the game code, assets, content, etc. for the primary wagering game are tied to the secondary game's code, assets, content, etc.

Some embodiments describe examples of presenting one or more secondary applications (e.g. secondary games, secondary wagering games, bonuses, etc.), in conjunction with a primary wagering game in a wagering game session. However, the primary wagering game and the one or more secondary applications are separate, such that their content, code, assets, etc. are not programmed together, and run as separate applications. Nevertheless, in some embodiments, the needs of the secondary application can integrate with functionality, information, or other features available from, or through, the primary wagering game. For instance, the primary wagering game can have wagering functionality and other game control features. The one or more secondary applications can utilize the wagering functionality or other game control features of the primary wagering game to conduct wagers within the secondary game (e.g., in a secondary wagering game associated with the primary wagering game). Further, in other examples, the primary wagering game can access financial data or account information that the secondary application also accesses. Some embodiments, therefore, can provide the wagering functionality, financial data, account information, or other features and information of the primary wagering game, to the secondary application, via application programming interfaces (APIs) available for the primary wagering game application and the secondary application. During the course of configuration, play, or at other times, some embodiments can also share content data across wagering game applications, such as passing three-dimensional object data from one wagering game application to another, adapting content from one application to stylistic data, environmental data, state data, or other data from another application, utilizing physics of one application to objects originating from another application, etc.

In some embodiments, a secondary application can be referred to as a "secondary game" as an example of a possible secondary application that is triggered, requested, supported, etc., by a primary wagering game, and which, in some embodiments, interacts with the primary wagering game. However, it should be noted that the secondary application is not limited to game applications, but could also be related to other secondary applications (e.g., promotional applications, social networking applications, player tracking applications, etc.) that can interact with the primary wagering game. Further, the terms "secondary" and "primary" can in some embodiments refer to respective importance, presentation order, or priority. In other embodiments, however, the terms "secondary" and "primary" can imply a separation of application processing, function, presentation, content, etc. (e.g., indicating that applications are independent of each other in programming, although they can have functionality that integrates, cooperates, etc.). Also, in some embodiments herein a player can be referred to interchangeably as a player account, or vice versa. Account-based wagering systems often utilize player accounts when transacting and performing activities, at the computer level, that are initiated by players. Therefore, a "player account" is often referred to herein as a representative of the player at a computerized level. Therefore, for brevity, to avoid having to describe the interconnection between player and player account in every instance, a "player account" can be referred to herein in either context. Further, in some embodiments herein, the word "gaming" can be used interchangeably with the word "gambling". Further, the words "wagering game" are used to indicate electronic (e.g., electromechanical, digital, computerized, etc.) games (e.g., slot games, electronic poker, electronic bingo, etc.) that use (e.g., process a form of, are based on, are funded by, etc.) a monetary bet or wager.

FIG. 1 is a conceptual diagram that illustrates an example of passing three-dimensional objects beyond the confines of a secondary wagering game application to interact with objects from a primary wagering game application, according to some embodiments. In FIG. 1, a wagering game system ('system") 100 includes a wagering game machine 160 connected to one or more wagering game servers (e.g., a primary wagering game server 150 and a secondary wagering game server 180) via a communications network 122. A cross-application content control server 140 can also be connected to the wagering game machine 160 via the communication network. The primary wagering game server 150 can provide content for a primary wagering game application 102. The secondary wagering game server 180 can provide content for a secondary wagering game application 104. One or more of the primary wagering game application 102 or the secondary wagering game application 104 can be an application that involves betting, or wagers. The primary wagering game application 102 can be referred to herein as a "primary application" or "first application." Similarly, the second wagering game application 104 can be referred to herein as a "secondary application" or a "second application." The cross-application content control server 140 can pass object data (e.g., three-dimensional object data) from one wagering game application to another wagering game application, or other distinct and separate applications, involved in presenting and supporting wagering games. For example, the cross-application content control server 140 can control the movement of one or more objects (e.g., the coins) native to the secondary wagering game application 104 to the primary wagering game application 102, and vice versa. For instance, the system 100 can cause coins 106 from the secondary wagering game application 104 to come under the control of (e.g., introduce them as foreign objects to) the primary wagering game application 102. The primary wagering game application 102 can receive the objects and take over their control according to physics and other governing rules of the primary wagering game application 102. In some embodiments, the primary wagering game application 102 can render the coins 106 in a stylized manner fitting a theme of a game. In other examples, the system 100 can cause objects from the secondary wagering game application 104 to appear to leave the confines of a boundary 112 of the secondary wagering game application 104, and appear to interact with content from, or in any other way appear to integrate with the primary wagering game application 102. Further below, many examples describe many ways that application content can appear to integrate and/or interact with each other by appearing to leave the domain (e.g., confines, boundaries, control, etc.) of the application from which they originated and enter the domain of another application. Specifically, many embodiments describe how object data (e.g., three dimensional and two dimensional), environmental data, stylistic data, and other data related to content, can be passed between applications and used to make the applications content appear to adapt to or integrate with each, even though the applications are separate and distinct applications. Further, in some embodiments, the interactions of the objects can generate object effects or peripheral reactions on peripheral devices or other hardware (e.g., tie stylistic data into ambient sounds, tie object interactions into emotive lighting, move objects into peripheral displays, etc.). FIG. 1 will be described in further detail in conjunction with FIG. 3 further below.

Further although FIG. 1 describes some embodiments, the following sections describe many other features and embodiments. Some embodiments may include other configurations different from FIG. 1. For example, although FIG. 1 includes servers (e.g., a primary wagering game server 150, a secondary wagering game server 180, a cross-application content control server 140), some embodiments may include one or more wagering game machines 160, or other devices (e.g., peer-to-peer), that transfer and control object data between applications.

Example Operating Environments

This section describes example operating environments and networks and presents structural aspects of some embodiments. More specifically, this section includes discussion about wagering game system architectures.

Wagering Game System Architecture

Figure 2:
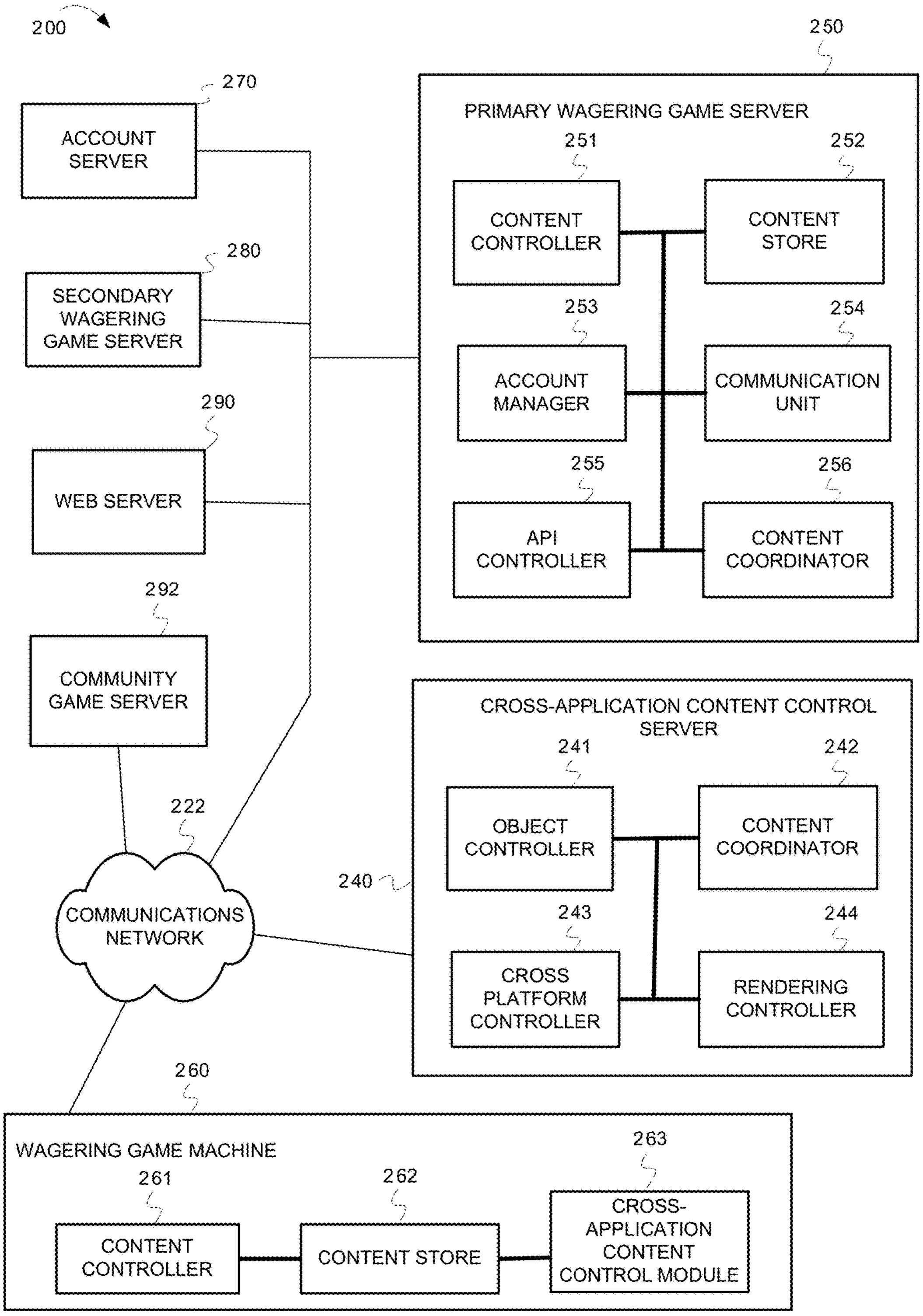
FIG. 2 is an illustration of a wagering game system architecture 200, according to some embodiments.

FIG. 2 is a conceptual diagram that illustrates an example of a wagering game system architecture 200, according to some embodiments.

The wagering game system architecture 200 can include a primary wagering game server 250 configured to control primary wagering game content, provide random numbers, and communicate wagering game information, account information, and other information to and from a wagering game machine 260. The primary wagering game server 250 can include a content controller 251 configured to manage and control presentation of primary content on the wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. The primary wagering game server 250 can also include a content store 252 configured to contain content to present on the wagering game machine 260. The primary wagering game server 250 can also include an account manager 253 configured to control information related to player accounts. For example, the account manager 253 can communicate wager amounts, game results amounts (e.g., win amounts), bonus game amounts, etc., to an account server 270. The primary wagering game server 250 can also include a communication unit 254 configured to communicate information to the wagering game machine 260 and to communicate with other systems, devices and networks. The primary wagering game server 250 can also include an API controller 255 configured to control interface between applications, including controlling data communications between applications to pass content data, including three-dimensional object data, for three-dimensional objects between applications. The primary wagering game server 250 can also include a content coordinator 256 configured to control data associated with content ("content data"), including three-dimensional objects. The content coordinator 256 is also configured to determine object properties, characteristics, physics, geometry, and other object data. The content coordinator 256 can use the content data to cause content from one application to leave the domain of the application and interact, or appear to interact, with content from another application. The content coordinator 256 can be configured to control the interactions according to governing rules, instructions, or other programming, of one or the other applications, or a mixture of from both. The content coordinator 256 can also be configured to package the content data, and deliver it to applications, so that the applications can decipher the data and use it to control objects, change stylistic data, adapt to environmental conditions, combine content, render data, control priorities, etc.

The wagering game system architecture 200 can also include the wagering game machine 260 configured to present wagering games and receive and transmit information to control cross-application wagering game content. The wagering game machine 260 can include a content controller 261 configured to manage and control content (e.g., primary content, secondary content, tertiary content, etc.) and presentation of content on the wagering game machine 260. The wagering game machine 260 can also include a content store 262 configured to contain content to present on the wagering game machine 260. The wagering game machine 260 can also include a cross-application content control module 263 configured to control content interaction between applications on the wagering game machine 260. For example, the cross-application content control module 263 can be configured to receive data from the content coordinator 256 regarding three-dimensional object (e.g., object graphics, object sounds, object properties, object functions, object physics, object dimensions, etc.). The cross-application content control module 263 can use that data to control the objects when they leave the domain, control, confines, etc. of one application and enter the domain, control, confines, etc. of another application. In some embodiments, the cross-application content control module 263 can provide data for applications running on the wagering game machine 260 to the cross-application content control server 240 and/or to the primary wagering game server 250, to control the object interactions and other content activity that occurs, or appears to occur, between applications on the wagering game machine 260, or on other wagering game machines connected to the communications network 222.

The wagering game system architecture 200 can also include a secondary wagering game server 280 configured to provide content for one or more of the applications associated with the wagering game machine 260. The secondary wagering game server 280 can provide "secondary" content, or content for "secondary" games presented on the wagering game machine 260. In some embodiments, secondary content can be passed between applications, thus becoming, or falling under the control of, primary content or primary applications. In some embodiments, the secondary wagering game server 280 can have a similar architecture as that of the primary wagering game server 250.

The wagering game system architecture 200 can also include a web server 290 configured to present content in a web format. In some embodiments, the web server 290 can cause content interactivity (e.g., cause objects from one web application to leave the web application's domain and enter the domain of another web application presented within a web-browser).

The wagering game system architecture 200 can also include a community game server 292 configured to provide and control content for community games, including networked games, social games, competitive games, or any other game that multiple players can participate in at the same time.

The wagering game system architecture 200 can also include a cross-application content control server 240 configured to control content that moves and/or appears to move, between applications on the communications network 222, including one or more wagering game applications on the wagering game machine 260. The cross-application content control server 240 can include an object controller 241 configured to store, receive, send, and control object data for objects, including three-dimensional type objects, associated with multiple applications. The object controller 241 can also be configured to receive overall stylistic data, environmental data, state data, etc. of various applications and cause objects to adapt to the stylistic data, environmental data, state data, etc. The cross-application content control server 240 can also include a content coordinator 242 configured to coordinate priorities of interactivity between objects of multiple applications. The cross-application content control server 240 can also include a cross-platform controller 243 configured to control the format of content data to ensure that different platforms in a wagering game network can receive object data from many different types of applications on the network and use the content data to depict object interactions (e.g., three-dimensional object interactions). The cross-application content control server 240 can also include a presentation controller 244 configured to generate presentation data (e.g., rendering data) for content (e.g., three-dimensional objects) that is passed between applications, or that appears to be passed between applications. The presentation coordinator 244 can also be configured to present the content as appearing to interact within the domain of one of the applications.

Each component shown in the wagering game system architecture 200 is shown as a separate and distinct element connected via the communications network 222. However, some functions performed by one component could be performed by other components. For example, the primary wagering game server 250 can also be configured to perform functions of the cross-application content control server 240, and other network elements and/or system devices. Furthermore, the components shown can all be contained in one device, but some, or all, can be included in, or performed by multiple devices, as in the configurations shown in FIG. 2 or other configurations not shown. For example, the account manager 253 and the communication unit 254 can be included in the wagering game machine 260 instead of, or in addition to, being a part of the primary wagering game server 250. Further, in some embodiments, the wagering game machine 260 can determine wagering game outcomes, generate random numbers, etc. instead of, or in addition to, the primary wagering game server 250. The wagering game machine 260, or other wagering game machines described herein can take any suitable form, such as floor standing models, handheld mobile units, bar-top models, workstation-type console models, surface computing machines, etc. Further, the wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as a thin, thick, or intermediate client. For example, one or more elements of game play can be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules can be managed centrally (e.g., by the wagering game server(s)) or locally (e.g., by the wagering game machines). Other functionality not directly related to game play can include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
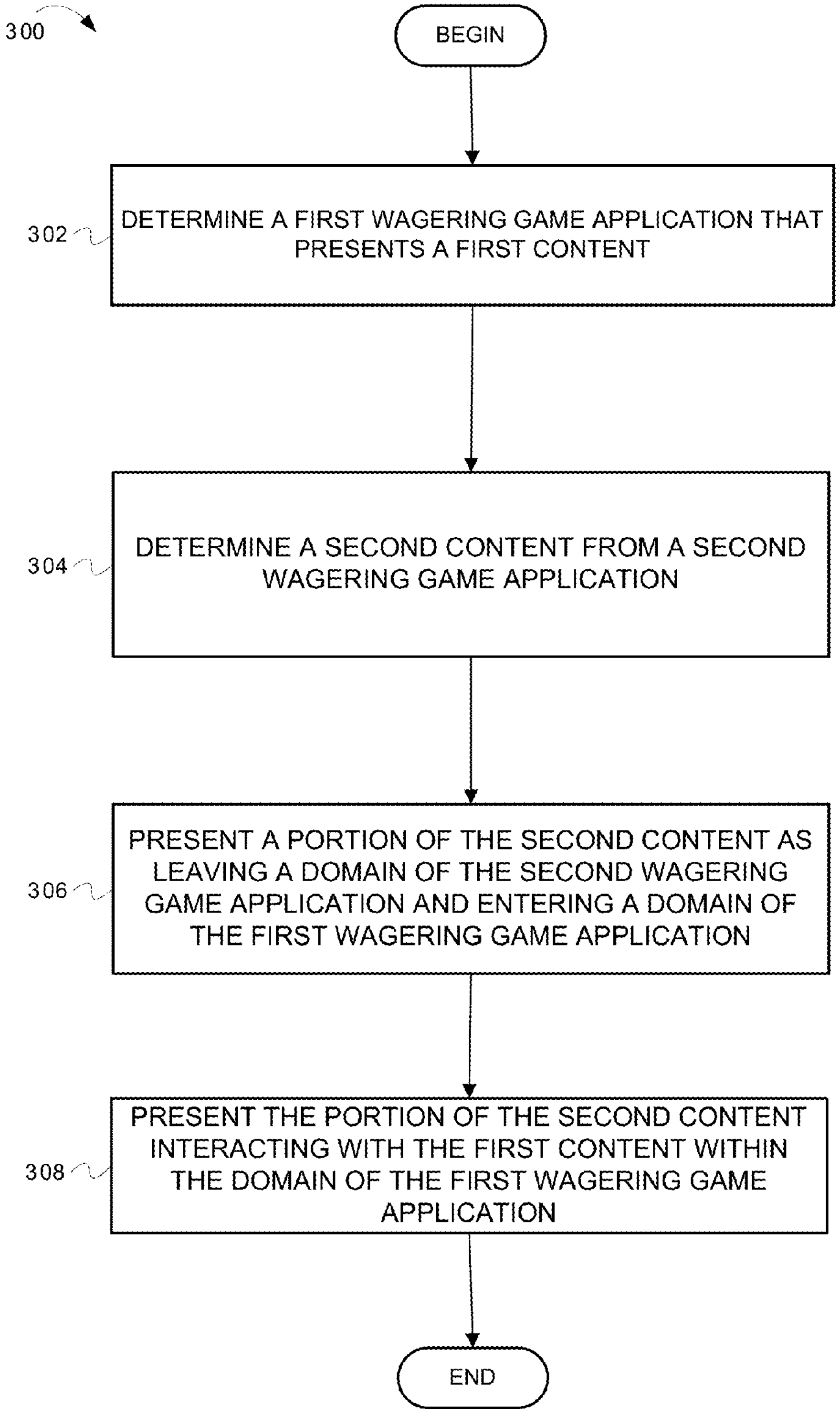
FIG. 3 is a flow diagram 300 illustrating presenting content across wagering game applications, according to some embodiments.

FIG. 3 is a flow diagram ("flow") 300 illustrating presenting content across wagering game applications, according to some embodiments. FIG. 1 is a conceptual diagram that helps illustrate the flow of FIG. 3, according to some embodiments. This description will present FIG. 3 in concert with FIG. 1. In FIG. 3, the flow 300 begins at processing block 302, where a wagering game system ("system") determines a first wagering game application that presents one or more first content ("first content"). For example, in FIG. 1, the primary wagering game application ("first application") 102 presents multiple application objects or assets, such as game reels 107 that include game play elements, such as a strawberry graphic 105, and other graphics (e.g., shamrocks, apple cores, "Lucky 7s"). The game reels 107 can be multi-dimensional objects, such as three-dimensional objects that appear to have dimensions of length, width, and depth. The game play elements can also have the appearance of three-dimensional objects. Non-game play objects, such as a bet meter 111, a credit meter 113, a spin control 115, and a bet control 108 can also be three-dimensional objects. In some embodiments, however, the objects can appear as two-dimensional objects, yet have three-dimensional properties (e.g., a two-dimensional looking reel graphic showing width and length, but that can interact with other objects in a three-dimensional type environment, utilizing a depth dimension, though not visually depicting a depth dimension). For instance, some objects can appear to grow larger or smaller as they move within a depth dimension, although the objects themselves may not include shading or dimensions that depict the depth dimension. In another example, some objects can appear to move behind, in front of, or on other objects, although those other objects may not have visual dimensions of depth.

The flow 300 continues at processing block 304, where the system determines one or more second content ("second content") from a second wagering game application. The first wagering game application and the second wagering game application are independent applications. The second content, like the first content, can include multi-dimensional objects (e.g., three-dimensional objects and two-dimensional objects). For example, in FIG. 1, the coins 106 can be three-dimensional objects that are controlled by the secondary wagering game application ("second application") 104. The second application 104 can include other objects, such as the bet control 108, that a player can use to place bets for the second application 104. In some embodiments, the second application 104 can react to programming that initiates operations to integrate some of its objects (e.g., the coins 106) into one or more other applications, such as incorporating the coins 106 into the first application 102.

The flow 300 continues at processing block 306, where the system presents a portion of the second content as leaving a domain of the second wagering game application and entering a domain of the first wagering game application. The domain of the second application can include boundaries, borders, or some perceived space wherein the content of the second application normally resides. Likewise, the domain of the first application can also include boundaries, borders, or some perceived space wherein the content of the primary application usually resides. In some embodiments, the domain of the second application can appear to overlap, or appear to reside within a space controlled by the primary application, but distinguished by its own domain. For example, in FIG. 1, the second application 104 includes the boundary 112 from with the coins 106 originate, normally reside in, exist in, are controlled by, or otherwise are associated with the second application 104 according to the programming and/or control of the second application 104. The system 100 (e.g., the second application 104) can direct some the coins 106 to appear to leave the boundary 112. The coins 106 appear to move beyond the boundary 112, or otherwise terminate or stop being displayed or presented within the second application 104 and, concurrently, or at the same time, appear to enter the areas under the control, or within the domain of, the first application 102. The first application 102 also includes a boundary 119 that encloses content for the first application 102. However, the boundary 112 resides entirely within the boundary 119. The system 100 can cause the coins 106 to appear to burst from the boundary 112 of the second application 104 and pour onto the game reels 107 within the boundary 119 (e.g., as a result of a large win, a jackpot, etc.). In other embodiments, however, the boundary 112 can abut, or share, the boundary 119 and not reside within the boundary 119. In other embodiments, the boundary 112 can be separated from the boundary 119 by space (e.g., a domain of a third application, an operating system domain, etc.). In other embodiments, the boundary 112 can reside on a different display (e.g., on a peripheral display of the wagering game machine 160) or even on a different device (e.g., on a neighboring wagering game machine). In some embodiments, the coins 106 do not burst from the boundary 112 (e.g., does not involve boundary destruction) but can pass over the boundary 112. In yet other embodiments, the coins 106 can disappear from within the boundary 112 and reappear outside the boundary 112, though within the boundary 119. In other embodiments, the coins 106 can leave and return to the domain of the second application 104.

The flow 300 continues at processing block 308, where the system presents the portion of the second content interacting with the first content within the domain of the first wagering game application. For example, in FIG. 1, when the coins 106 leave the boundary 112, some of the coins 106 can appear to fall behind the game reels 107, some of the coins 106 can appear fall in front, while some of the coins 106 can appear to hit, and react with, the game reels 107. For instance, coin 106A appears to bounce off the top of one of the game reels 107. Some of the coins 106 can appear to interact with some objects according to intelligent reactions (e.g., artificial intelligence programming). For example, the strawberry graphic 105 can appear to see coin 106B and react to the coin 106B (e.g., have a scared expression, swat the coin 106B away, appear to eat the coin 106B, etc.). Some of the coins 106 can interact with other some elements of the game reels 107 in ways that can affect, or appear to affect, the outcome of a wagering game presented on the game reels 107. For example, coin 106C can collide with a Lucky7 graphic 109, and knock it off the game reels 107. The first application 102 can replace the Lucky7 graphic 109 with a mystery graphic, an award, a "wild" card, an avatar, one of the other game play elements, or some other object in place of the Lucky7 graphic 109. In some embodiments, the system 100 can affect the function or math of the first application 102 as the coin 106C knocks the Lucky7 graphic 109 from the game reels 107 and replaces it with a winning or losing symbol.

Figure 4:
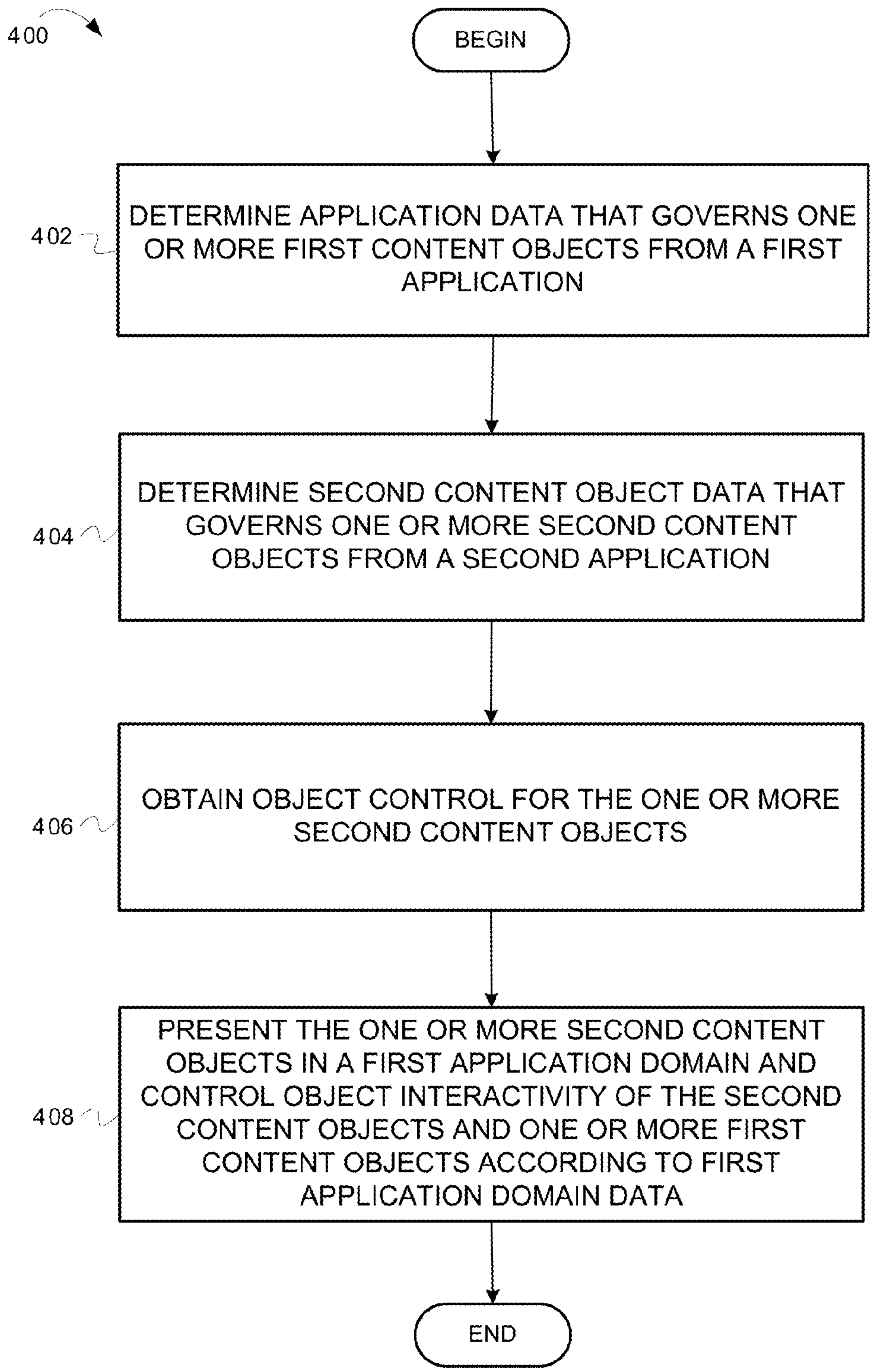
FIG. 4 is a flow diagram 400 illustrating transferring object control between wagering game applications, according to some embodiments.
Figure 5:
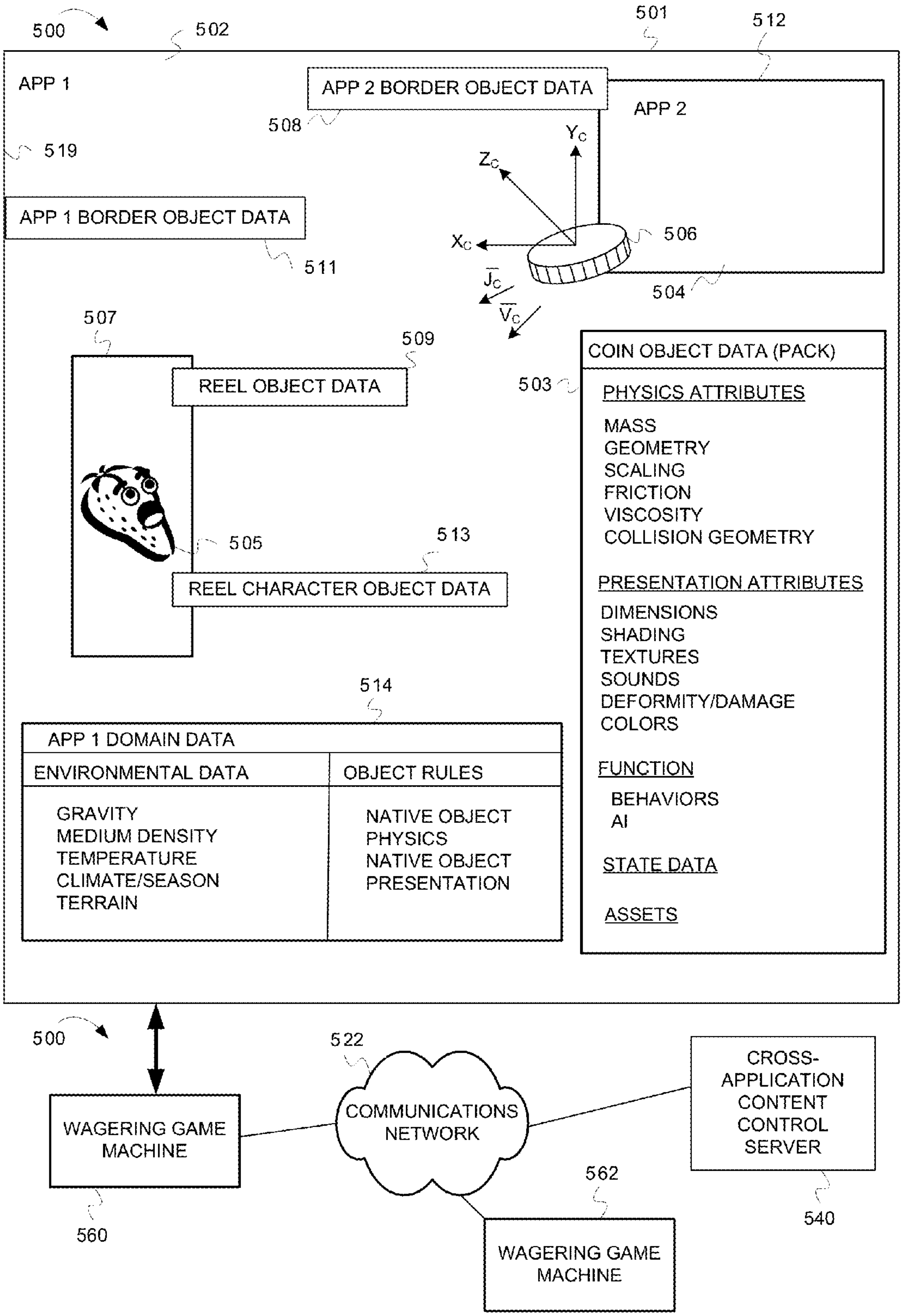
FIG. 5 is an illustration of transferring objects from a secondary application to a primary application, according to some embodiments.

FIG. 4 is a flow diagram ("flow") 400 illustrating transferring object control between wagering game applications, according to some embodiments. FIG. 5 is a conceptual diagram that helps illustrate the flow of FIG. 4, according to some embodiments. This description will present FIG. 4 in concert with FIG. 5. In FIG. 4, the flow 400 begins at processing block 402, where a wagering game system ("system") determines application data that governs one or more first-content objects from a first application. The first-content objects are included in a first content for the first application. FIG. 5 illustrates an example. In FIG. 5, a wagering game system ("system") 500 includes a wagering game machine 560 connected to a communications network 522. The system 500 also includes a second wagering game machine 562 and a cross-application content control server 540 connected to the communications network 522. The wagering game machine 560 presents a display 501 of a first application 502 and a second application 504. The first application 502 can include programming (e.g., code, libraries, configuration files, etc.) related to objects that are part of the first applications' programming (e.g., native to, originated by, controlled by, contained within, etc.). Some examples of objects that are part of the first application include a border 519, a reel 507, and a reel character 505. Some objects are stationary, or non-moving, such as the border 519 and the reel 507. Other objects can move, like the reel character 505. Each of the objects can have object data (e.g., programming, settings, parameters, variables, configurations, attributes, instance data, etc.) that define the object's identity, state, appearance, behavior, etc. The object data can include three-dimensional object data related to an object in three dimensions of geometric dimensions, orientations, space, movement, etc. Some examples of object data can include physics attributes (e.g., mass, structural geometry, scaling, friction, viscosity, collision geometry, etc.), presentation attributes (e.g., dimensions, shading, textures, sounds, deformity, colors, etc.), and function (e.g., programmed behaviors, movement directives, reactions to other objects, location limitations, artificial intelligence behaviors, etc.). The object data for the objects are associated with the objects (e.g., border object data 511 is associated with the border 519, the reel object data 509 is associated with the reel 507, reel character object data 513 is associated with the reel character 505, etc.). In other words, the first application 502 has access to the object data (e.g., within its programming, within memory, etc.) and can use the object data to control the objects within a domain (e.g., the border 519, an object grid, a machine bank territory, a network section, etc.) that the first application 502 has rights to access and control. The first application 502 also has domain data 514 that can include programming related to an environment that objects encounter within the domain of the first application 502. For example, the domain data 514 can include data regarding the environment's gravity, density, temperature, climate, terrain, etc., which are qualities of the environment to which programmed objects can react. The domain data 514 can also include object rules that govern interaction of objects, presentation of objects, and other object activity.

The flow 400 continues at processing block 404, where the system determines second-content object data that governs one or more second-content objects from a second application. The second-content objects are included in a second content for the second application. For example, in FIG. 5, the second application 504 can also include objects (e.g., border 512, coin 506) and object data associated with the objects (e.g., border object data 508 associated with the border 512 and coin object data 503 associated with the coin 506). The second application 504 can also have domain rules that govern object activity within the domain of the second application 504 (e.g., within the border 512). In some embodiments, the system 500 determines the object data from the content within the second application 504 ("second-content object data"). The second-content object data governs one or more objects included in a portion of the second content. The coin 506, for example, is an object from the second content. The system can determine the coin object data 503 via an application programming interface (API). The coin object data 503 provides, via the API, or other such mechanism, a package of data related specifically to the coin 506. The system 500 can use the coin object data 503 to govern the behavior and/or appearance of the coin 506 beyond the domain of the second application 504. In some embodiments, the second application 504 provides the coin object data 503, including the objects physics attributes, presentation attributes, functions, etc. to the first application 502. In some embodiments, the second application 504 also provides state data about the objects from the second application 504, such as the coin 506. The state data can include location data (e.g., coordinates, vertices), movement data (e.g., velocity, trajectory, spin, momentum, etc.), temperature, etc., all of which are related to the current state of the object. The second application 504 can provide the state data in the coin object data 503, subcategorized as state data versus long-term/defining attributes. In some embodiments, however, the second application 504 can provide data that is not categorized and can transfer any or all data between applications at any time. The first application 502 can receive the coin object data 503 and use it to calculate an initial object state (e.g. initial velocity, initial coordinates, initial trajectory, initial temperature, etc.) for the coin 506 as it initially enters the first application's domain. In some embodiments, the system 500 can also provide other data, including file formats for graphics, player data, sounds, associated assets, etc., which can be related to current, or future, activity, appearance, behavior, etc. of the object (e.g., the coin 506) while it is within the first application's domain. In some embodiments, the system 500 can transmit (e.g., transfer, copy, pass, reflect, etc.) multi-dimensional (e.g., 3D) object information (e.g., 3D object position, orientation, etc.) physics data, and other object data using a specialized data container. For example, the system 500 can package the coin object data 503 into a special data container, or data package, which can be passed between applications (e.g., a platform-independent data container). When the first application 502 receives the coin object data 503, it can read (e.g., translate, load, use, etc.) the data, instantiate the object within its own domain, and use the coin object data 503 to control the coin 506 as if the coin 506 were a native object of the first application 502. In some embodiments, the system 500 can use a fixed format for the data, or the data package, so that multiple manufacturers can use the fixed format to transfer data across applications built on different platforms. The system can transmit the application data, object data, state data, etc. using an open standard so that any device that receives the data can interpret it and use it. In some embodiments, the system 500 can access object data and control objects via remote procedure call (RPC) communication, via inter-process communication (IPC) communication, via API communication, etc. In some embodiments, the system 500 can transfer multi-dimensional objects from one machine to another (e.g., from the wagering game machine 560 to the second wagering game machine 562). The system 500 can obtain the data (e.g., machine data, object data, application data, domain data, environmental data, control data, etc.) from one or more devices on the network, such as via management servers, configuration servers, floor layout servers, wagering game servers, account servers, application asset servers, wagering game machines, etc.

The flow 400 continues at processing block 406, where the system obtains object control for the one or more second-content objects. In some embodiments, the system obtains object control from the second application. For example, the system can obtain authorization, control rights, control signals, etc. from the second application. In some embodiments, the first application can receive the control directly from the second application. In some embodiments, the system obtains object control by instantiating a new object within the first application programming as soon as the original object begins to exit, or appears to exit, the second application's domain (e.g., the system stop rendering the original instance of the object when it touches the border and generates a copy, or new instance, of the object for the first application to use) and enters the first object's domain (e.g., as the object instance passes over the boundary of the second application into a space controlled by the first application). The instantiation can include rendering a new instance of the object within the first application's space and then controlling the new instance of the object as if it were a native object of the first application (e.g., incorporating the object's data into the first application's programming and allowing the programming to control object interactions and state). As a result, the first application could have complete control of the object. In some embodiments, the system can utilize a same instance of the object (e.g., the system passes along the location in memory of the object data), but provides control of the instance over to the first application to access and use. The instance of the new object can have an identical appearance, behavior, or other attribute of the original object, causing an effect on a graphical display that appears that the original object is passing from the first application's space to the second application's space.

The flow 400 continues at processing block 408, where the system presents the one or more second-content objects in a first application domain and controls object interactivity of the second-content objects and one or more first-content objects according to first application domain data. The system can control the presentation of the second content according to object interactivity rules of the first wagering game application. For example, in FIG. 5, the system 500 can present the coin 506 as leaving the border 512 and introduce the coin 506 into the confines of the first application with one or more predetermined motion vectors possessed by the coin 506. The system 500 can map the motion of the coin 506 along a trajectory based on an object layout grid. The system 500 can propel the coin 506 along the trajectory within the object layout grid based on the one or more predetermined motion vectors. The system 500 can apply physics rules from the first application 502 to the physical behavior of the coin 506 as soon as the coin 506 is within the confines of the first application 502. The system 500 can determine physical interactions between the coin 506 with one or more additional objects already within the confines of the first application 502 (e.g., the border 519, the reel 507, the reel character 505), and control the interaction of the coin 506 with the one or more additional objects according to object interactivity rules of the first application 502 (e.g., the object rules within the domain data 514). In some embodiments, the system 100 can indicate how long the coin 506 will exist within the confines of the first application 502 (e.g., indicate in the coin object data 503 a lifetime for the coin 506, indicate based on the domain data 514 that incorporated foreign objects dissolve/destruct when they collide with the border 519, etc.). In some embodiments, other applications or services, not just the first application 502, can use the control interactions between objects. For instance, the cross-application content control server 540 can receive all of the domain data (e.g., object data, application data, etc.) from the first application 502 and the second application 504 and control the physical interactions between objects as they interact within the domain of the first application 502 or the second application 504. The system 100 can also control collision sounds (e.g., the coin object data 503 can include different coin collision sounds to play when the coin 506 hits objects with different object densities).

Figure 6:
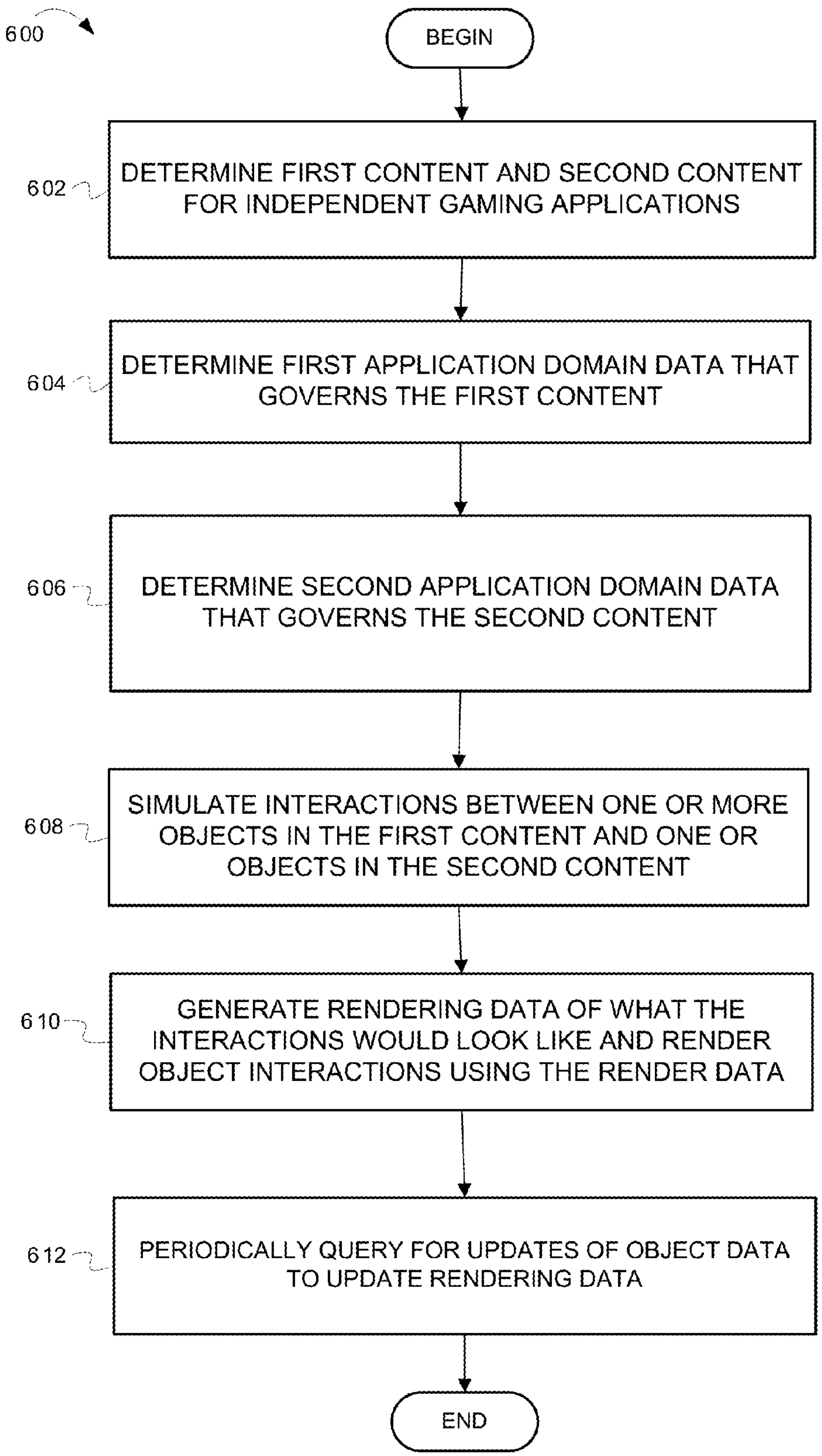
FIG. 6 is a flow diagram 600 illustrating rendering and presenting three-dimensional object interactions, according to some embodiments.
Figure 7:
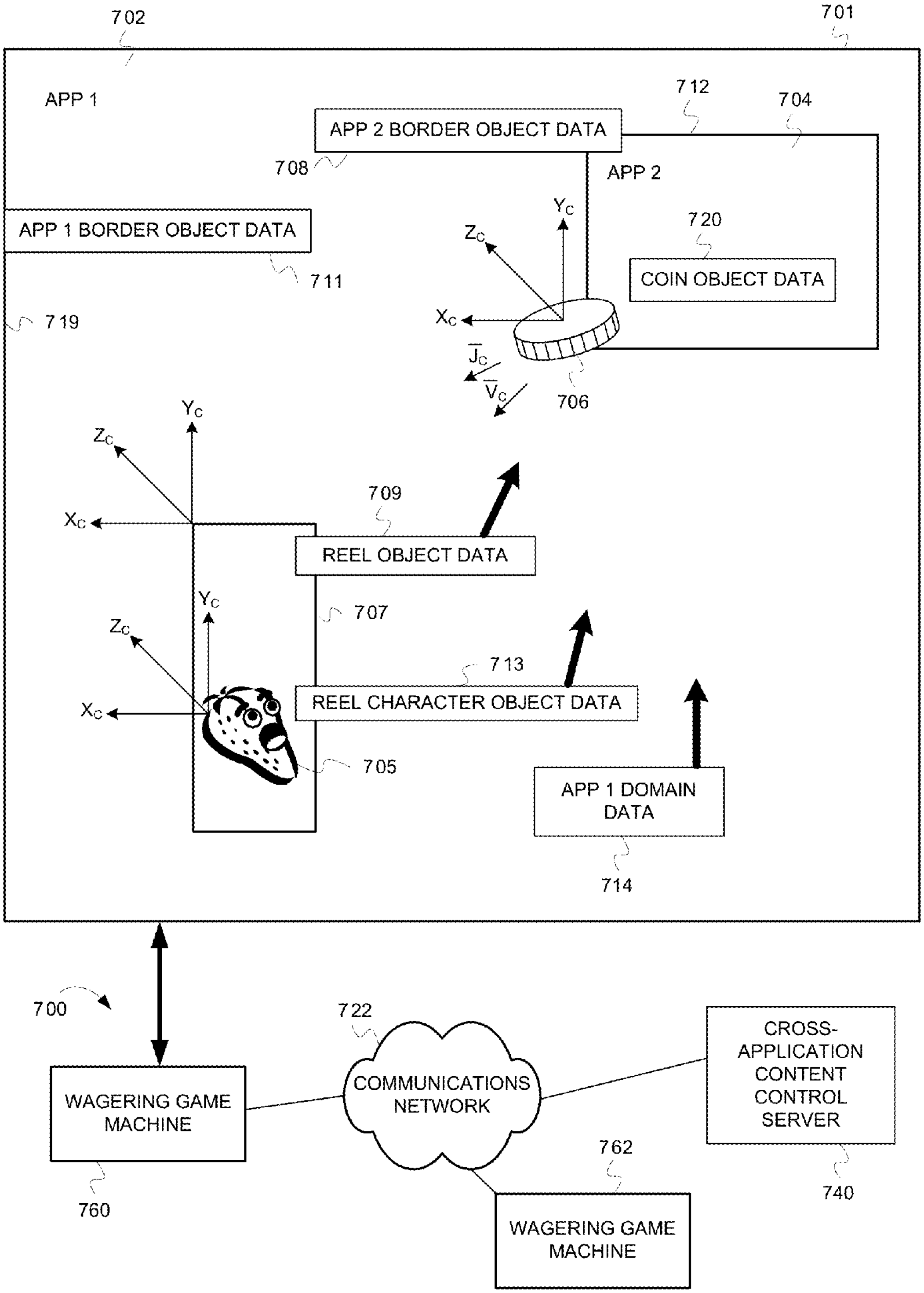
FIG. 7 is an illustration of generate rendering data of object interactions using primary content application data and secondary content application data, according to some embodiments.
Figure 8:
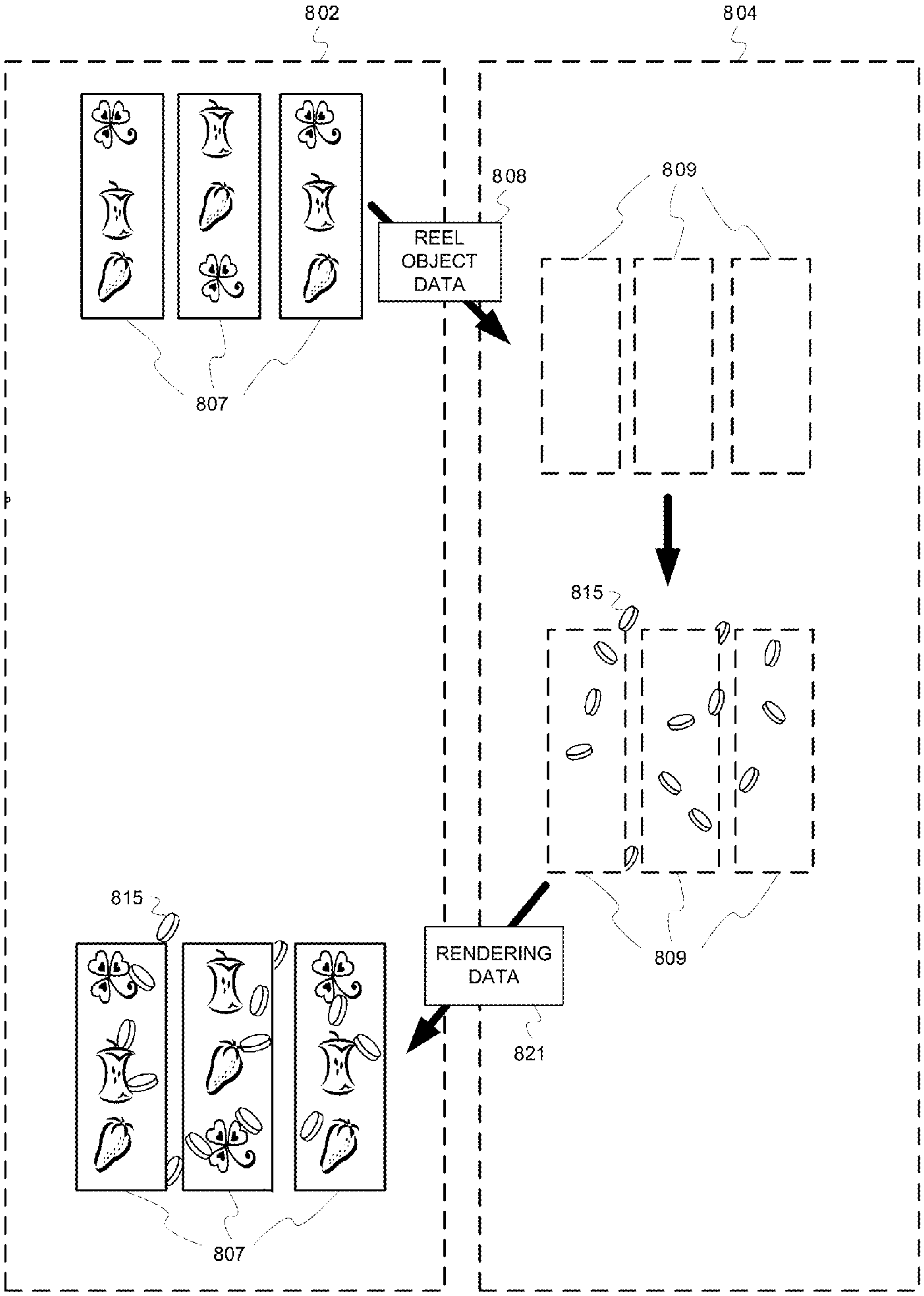
FIG. 8 is an illustration of overlaying content from multiple applications to present three-dimensional object interactivity, according to some embodiments.

FIG. 6 is a flow diagram ("flow") 600 illustrating rendering and presenting three-dimensional object interactions, according to some embodiments. FIGS. 7 and 8 are conceptual diagrams that help illustrate the flow of FIG. 6, according to some embodiments. This description will present FIG. 6 in concert with FIGS. 7 and 8. In FIG. 6, the flow 600 begins at processing block 602, where a wagering game system ("system") determines a first content and a second content for independent gaming applications. The first content can include one or more wagering game objects for a first wagering game application, such as a primary wagering game application. The second content can include one or more wagering game objects for a second wagering game application, such as a secondary wagering game application.

The flow 600 continues at processing block 604, where the system determines first application domain data that governs the first content. FIG. 7 illustrates an example. In FIG. 7, a wagering game system ("system") 700 includes a wagering game machine 760 connected to a communications network 722. The system 700 also includes a second wagering game machine 762 and a cross-application content control server 740 connected to the communications network 722. The wagering game machine 760 presents a display 701 of a first application 702 and a second application 704. Similar to described previously, the first application 702 can include programming related to objects that are part of the first applications' programming. Some examples of objects that are part of the first application include a border 719, a reel 707, and a reel character 705. Each of the objects can have object data that define the object's appearance, behavior, etc. The object data for the objects are associated with the objects (e.g., border object data 711 is associated with the border 719, reel object data 709 is associated with the reel 707, reel character object data 713 is associated with the reel character 705, etc.). The first application 702 also has domain data 714 that can include programming related to an environment that objects encounter within the domain of the first application 702. The domain data 714 can also include object rules that govern interaction of objects, presentation of objects, and other object activity.

The flow 600 continues at processing block 606, where the system determines second application domain data that governs the second content. For example, in FIG. 7, the second application 704 can also include objects (e.g., border 712, coin 706) and object data associated with the objects (e.g., border object data 708 associated with the border 712 and coin object data 720 associated the coin 706). The second application 704 can also have domain rules that govern object activity within the domain of the second application 704 (e.g., within the border 712). In some embodiments, the second application 704 can request all data (e.g., object attribute data, object location data, object physics data, object state data, object motion data, etc.) for objects outside of the domain of the second application 704, as described at the processing block 604. The second application can already know the information for the processing block 606, and, in some embodiments, does not need to perform the processing block 606. The second application 704 can perform subsequent operations described at processing blocks 608 through 612. In some embodiments, the first application 702 can perform the processing block 604, but not necessarily the processing block 606. In other embodiments, however, other devices or services, such as the cross-application content control server 740, can perform processing blocks 602 through 612. The cross-application content control server 740 can constantly track content data on all wagering game machines (e.g., wagering game machines 760, 762, etc. on the communications network 722). FIG. 7, however, illustrates one embodiment where the first application 702 delivers its object data (e.g., the reel object data 709, the border object data 711, and the reel character object data 713) and application data (e.g., the domain data 714) to the second application 704 to utilize.

The flow 600 continues at processing block 608, where the system simulates interactions between one or more objects in the first content and one or more objects in the second content. The system can simulate the interactions according to both the second content's object data, the second content's application data, the first content's object data and the first content's application data. For instance, in FIG. 7, the second application 704 generates a simulation that places all of the first application's three-dimensional objects (e.g., the reel 707, the reel character 705, the border 719), along with their respective object attributes, physics, behavior, etc. into the second application's object activity, and combines the activity of the first application's objects with the second applications objects in virtual rendition of what would occur.

The flow 600 continues at processing block 610, where the system generates rendering data of what the interactions would look like and renders object interactions using the render data. FIG. 8 illustrates an example. In FIG. 8, a first application 802 delivers reel object data 808 for reels 807. A second application 804 receives the reel object data 808 and generates reel masks 809 that approximate the locations, dimensions, attributes, physics, appearance, functions, state, and other object data associated with the reels 807. The second application 804 runs a simulation that shows an interaction of its own objects (e.g., coins 815) as they would behave if the objects were to move beyond the second application's domain and enter the first applications domain, with possible object interactions (e.g., the coins 815 moving in front of, behind, and/or interacting with the reel masks 809). The second application 804 takes into consideration the reel object data 808 and does simulation masking, blocking, clipping, overlaying, etc. and to simulate the imagery of the coins 815 and the reels 807 as composite imagery. For instance, the second application 804 can run a rendering pass and generate rendering data 821 of what the interactions of objects would look like as composite imagery (e.g., layers of reels and layers of coins appearing to physically interact, based on locations of the reels and coins and based on object physics data, but moving independently within their own layers) and provide the rendering data 821 to the first application 802. The first application 802 can then use the rendering data 821 to render the appearance of the coins 815 interacting with the reels 807. In other embodiments, the second application 804 can provide the rendering data to other application, devices, servers, etc., in addition to, or in place of, the first application, to display the rendering of the composite images of object interactions. Returning to FIG. 6, the flow 600 illustrates one example of generating the appearance of object interactions by transferring object data, but without having to transfer control of objects between applications.

The flow 600 continues at processing block 612, where the system periodically queries for updates of object data to update rendering data. Updates can include state data (e.g., information about current priorities, presentation state, control instructions, game outcomes, limitations, etc.). For example, in FIG. 8, the second application 804 can continuously request the reel object data 808 in a loop and re-render the interactions between the coins 815 and the reels because the reels 807 can have activity that limits the interference of the coins 815. The rendering can be done per frame, per object, or in other ways. The updates can also include updates physics data, attributes data, etc.

Figure 9:
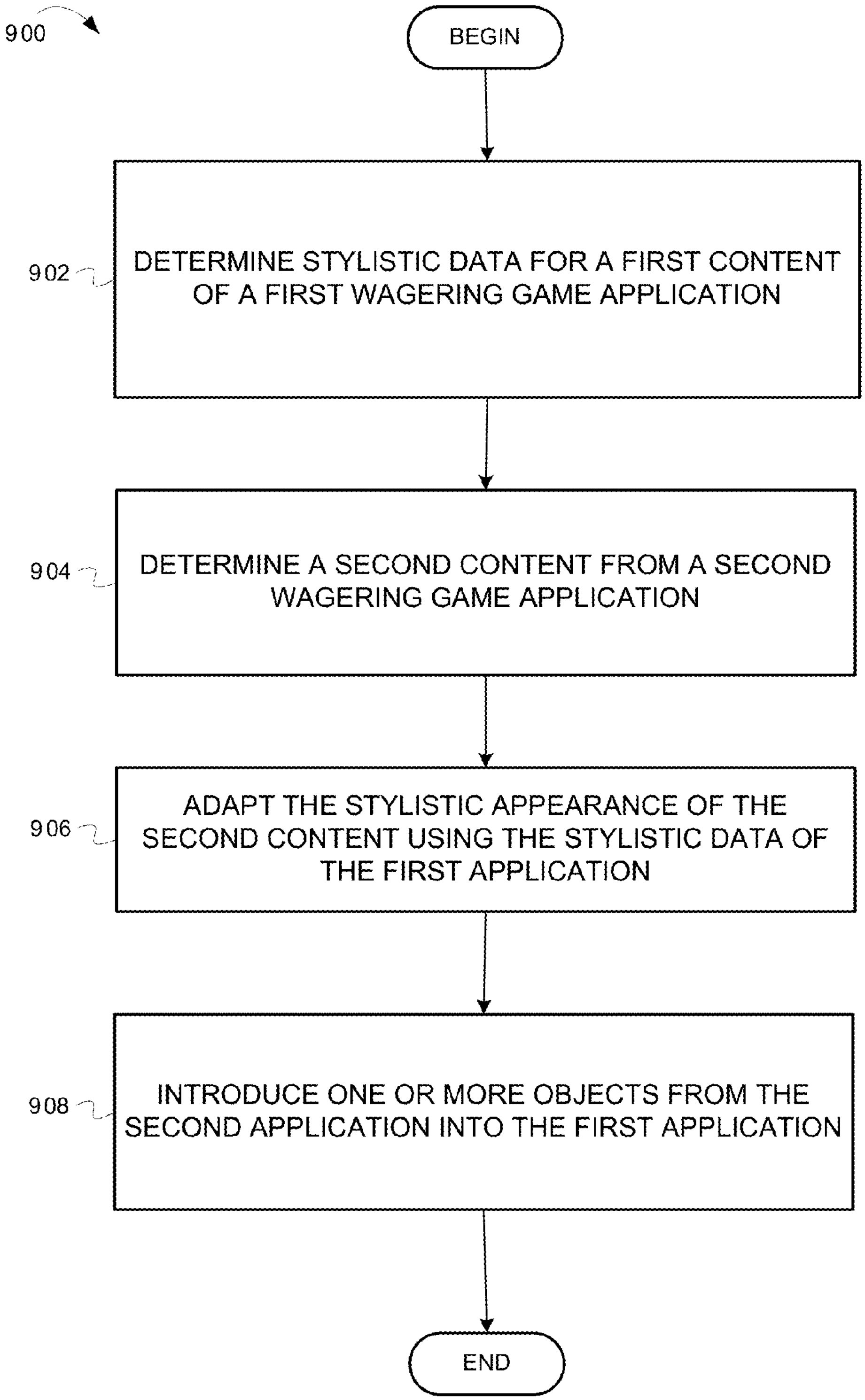
FIG. 9 is a flow diagram 900 illustrating adapting secondary content to primary content, according to some embodiments.

FIG. 9 is a flow diagram ("flow") 900 illustrating adapting secondary content to primary content, according to some embodiments. In FIG. 9, the flow 900 begins at processing block 902, where a wagering game system ("system") determines stylistic data for a first content of a first wagering game application ("first application"). The stylistic data concerns how the first application stylistically presents the first content within the domain of the first application. The stylistic data can include configurations, settings, theme data, visual behavior, functional data, environmental factors, terrain, textures, color palettes, backgrounds, seasonal graphics, climate, occlusion, fonts, etc. The stylistic data can also include data that should not be used, or adapted, by other applications. For example, the stylistic data can limit what stylistic data can be shared with other applications, and what stylistic data should remain native only to the first application. The first wagering game application can use the stylistic data to present one or more three-dimensional objects within the domain of the first wagering game application. The first application can also provide other application data, state data, object data, domain data, etc., in addition to the stylistic data. The system can make period updates of data.

The flow 900 continues at processing block 904, where the system determines a second content from a second wagering game application ("second application"). The second content can include multiple objects, assets, or other items used in the content of the second application. The first application and the second application are independent applications. The second application can also include other stylistic data that is different from the stylistic data for the first application. In other words, the first application has a "first" stylistic schema (e.g., look-and-feel, theme, environment, etc.) and the second application has a "second" schema, but the two schemas are designed to be different.

The flow 900 continues at processing block 906, where the system adapts the stylistic appearance of the second content using the stylistic data of the first application. The system can replace the second stylistic schema with the first stylistic schema, causing the second application to adapt to the style of the first application. In effect, the system causes the second application to reconfigure itself to appear similar to the style, or theme, of the first application. In some embodiments, the function of the second application does not change. For instance, in some embodiments, the second game does not change the activities that it performs. However, the environment in which game elements, like reels, cards, picker grids, etc. are set can change, for example, to have similar fonts, similar backgrounds, similar colors, etc. Thus, the system can cause the second application to appear to be a module, or child, of the first application, or vice versa, while still being separate applications and having separate functions. The system can cause the second application to change, in some embodiments, by passing parameters, assets, settings, configurations, etc. to the second application to use. In some embodiments, the system can re-skin the second application. In some embodiments, the stylistic data can be broken down into subcategories. The system can access the stylistic data according to the subcategories and provide some, or all, of the stylistics data to the second application. The second application can use some, or all, of the stylistic data (e.g., some categories versus other categories). For example, the system can change only the font styles of the second application to match the first applications font styles. The system can also cause the first application to adapt to the style data of the second application. In some embodiments, the system can also cause the first and second applications to change to a style of another application, a network broadcast, or other content provided by another device, service, etc. For instance, a progressive server can award a jackpot to a player account. Other player accounts can use several different types of applications on various wagering game machines across a wagering game network. The system can cause the several applications on the various machines to take on a theme, or stylistic schema, for a wagering game application that won the progressive jackpot.

The flow 900 continues at processing block 908, where the system introduces one or more objects from the second application into the first application. The system can cause the objects from the second application to interact with the one or more objects of the first content. The system can adapt the objects to the stylistic schema of the first application. For instance, following the example of the progressive game described in the paragraph above, when the player account wins the progressive jackpot, the player account, in one embodiment, is playing a fighter jet themed game (e.g., a wagering game based on the theme of the movie "Top Gun"). The system, in return, can initiate an operation that will send an image of a fighter jet across the network, to display the amount of the jackpot, and include a graphic of an avatar for the player account who won the jackpot. However, when the system sends the fighter jet across machine displays, the system can determine the color for the fighter jet, and the font of the information on the fighter jet, to be adapted to the colors and fonts for games that other players are playing on the wagering game machines on the network. Thus, for example, the fighter jet can fly onto a display of a first wagering game machine, played by a first player account. The system can cause the jet to have a red color and a serif font according to stylistic configurations from a primary game application on the first wagering game machine. However, when the fighter jet flies across the display of a second wagering game machine, used by a second player account, the system can adapt the color of the jet to be blue, and adapt the font to be a san-serif font, according to stylistic configurations of a primary game application on the second wagering game machine.

Figure 10:
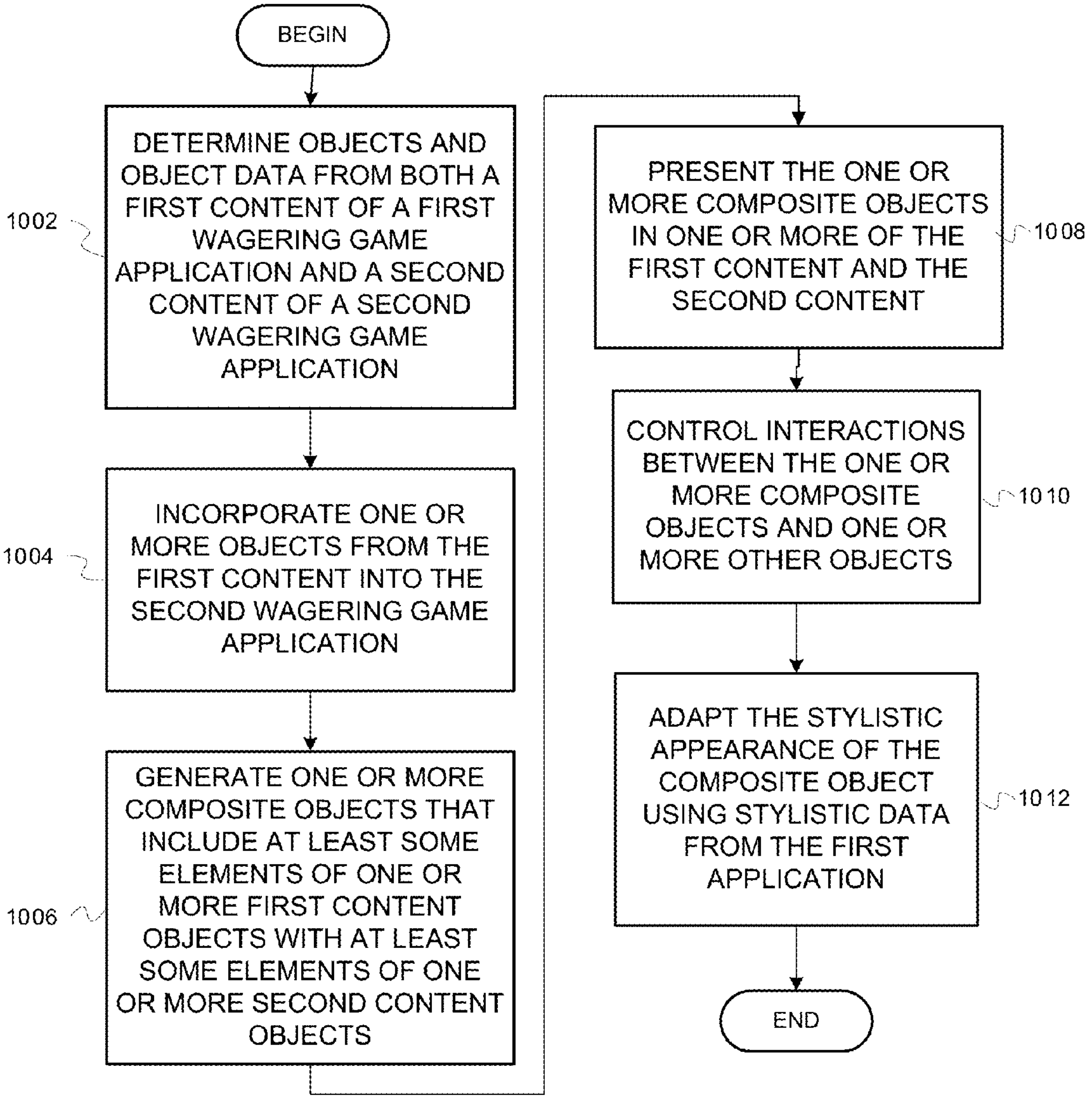
FIG. 10 is a flow diagram 1000 illustrating adapting and incorporating wagering game content across applications, according to some embodiments.
Figure 11:
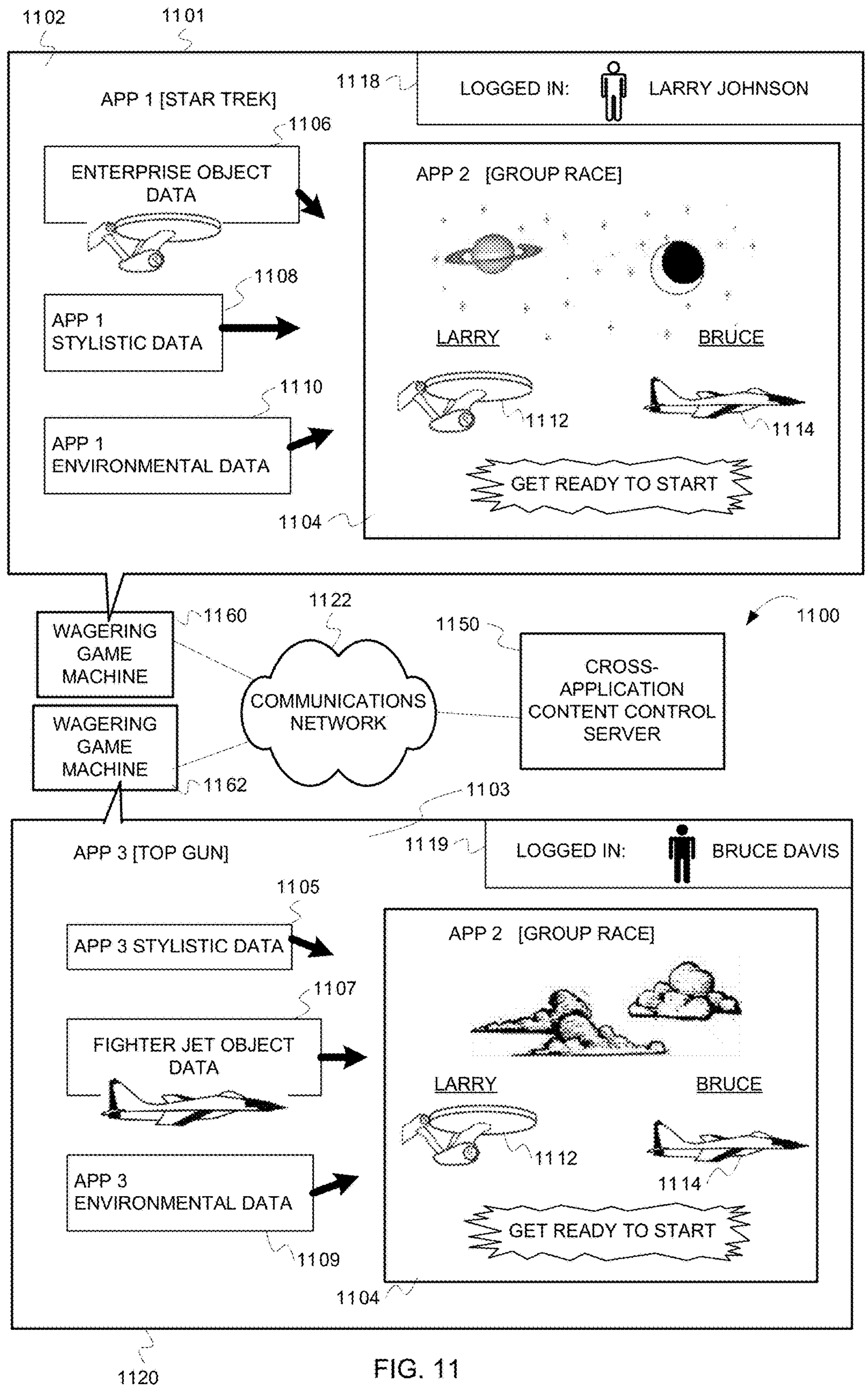
FIG. 11 is an illustration of incorporating primary wagering game content into secondary group game content, according to some embodiments.
Figure 12:
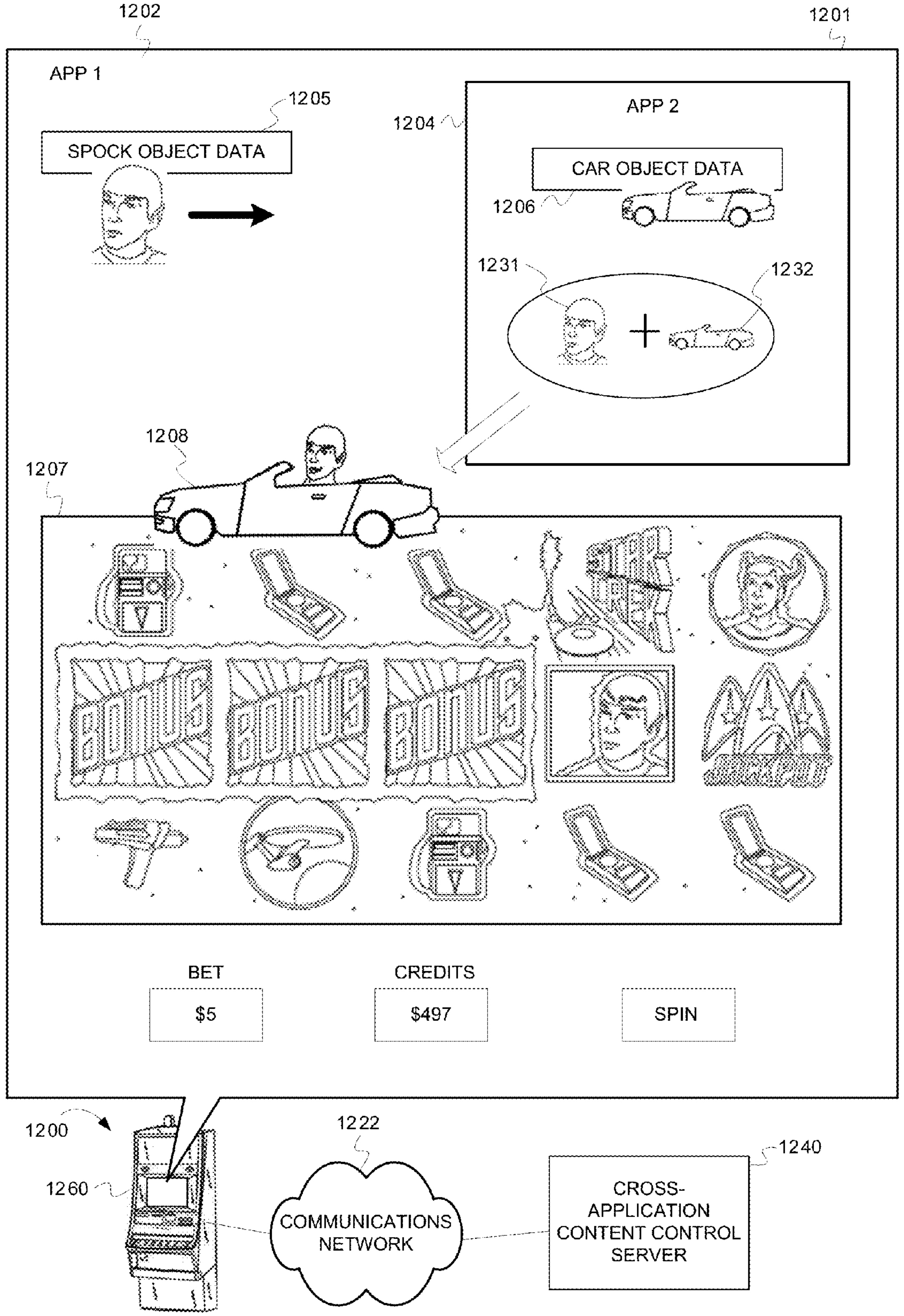
FIG. 12 is an illustration of combining content from a secondary wagering game application and a primary wagering game application, according to some embodiments.

FIG. 10 is a flow diagram ("flow") 1000 illustrating adapting and incorporating wagering game content across applications, according to some embodiments. FIGS. 11 and 12 are conceptual diagrams that help illustrate the flow of FIG. 10, according to some embodiments. This description will present FIG. 10 in concert with FIGS. 11 and 12. In FIG. 10, the flow 1000 begins at processing block 1002, where a wagering game system ("system") determines objects and object data from both a first content of a first wagering game application ("first application") and from a second content of a second wagering game application ("second application"). The system can also determine state data, stylistic data, artistic requirements (e.g., minimum scaling factor, maximum scaling factor, etc.), or any other information related to the objects within the first and second content, as described previously.

The flow 1000 continues at processing block 1004, where the system incorporates one or more objects from the first content into the second application. FIG. 11 illustrates an example. In FIG. 11, a wagering game system ("system") 1100, includes a first wagering game machine 1160 connected to a communications network 1122. The system 1100 can also include a second wagering game machine 1162 and a cross-application content control server 1150, also connected to the communications network 1122. The first wagering game machine 1160 presents a first display 1101 where a first wagering game application 1102 (e.g., a "Star Trek" themed game) includes application data (e.g., stylistic data 1108, environmental data 1110, state data, etc.) and object data (e.g., a "Starship Enterprise" object data 1106). The system 1100 can receive the application data and object data from the first wagering game application ("first application") 1102 and provide it to a second application 1104 (e.g., a group racing competition game). The system can utilize the object data 1106 during the presentation of content for the second application 1104. For example, the second application 1104 can provide vehicles for players to race during the course of play for the second application 1104. The system 1100 can determine that a first player account 1118 (e.g., Larry Johnson), is logged in to the first wagering game machine 1160, and is playing the first application 1102 as the primary wagering game. The system 1100 can utilize the Starship Enterprise object data 1106 from the first application 1102 and incorporate an Enterprise object 1112 into the second application 1104 as a representative vehicle for the first player account 1118 to utilize while participating in a competitive group race. In a similar fashion, a second player account 1119 (e.g., Bruce Davis) is playing a different primary wagering game, or a "third" wagering game application ("third application") 1103 on the second wagering game machine 1162. The system can determine that the third application 1103 (e.g., a "Top Gun" game) utilizes its own application data (e.g., stylistic data 1105, environmental data 1109, etc.) and its own themed object data (e.g., "fighter jet" object data 1107). The system 1100 can utilize the fighter jet object data 1107 from the third application 1103 and incorporate a fighter jet object 1114 into the second application 1104 as a representative vehicle for the second player account 1119 to utilize while participating in the competitive group race. The system 1100 can also utilize application data for the first application 1102 and the third application 1103 to, respectively, adapt the appearance of the second application 1104. For example, the system 1100 causes the background of the second application 1104 on the first display 1101 to present a space environment, similar to an environment used by the first application 1102. At the same time, the system 1100 causes the background of the second application 1104 on a second display 1120, for the second wagering game machine 1162, to appear as a sky environment, similar to an environment used by the third application 1103.

The flow 1000 continues at processing block 1006, where the system generates one or more composite objects that include at least some elements of one or more first-content objects with at least some elements of one or more second-content objects. FIG. 12 illustrates an example. In FIG. 12, a wagering game system ("system") 1200 includes a wagering game machine 1260 connected to a communications network 1222. The system 1200 also includes a cross-application content control server 1240. The wagering game machine 1260 presents a display 1201. The display 1201 includes a first application 1202 and a second application 1204. The first application 1202 can include a specific theme, such as a Star Trek theme, with reels 1207 that depict some Star Trek characters. For instance, one Star Trek character, "Spock," can be associated with "first-content" object data (e.g., Spock object data 1205). For example, the system 1200 can provide the Spock object data 1205, which can include assets for a Spock character graphic 1231, to the second application 1204. The second application 1204 includes a "second-content" object, and associated data (e.g., car object data 1206) related to a car object 1232 native to the content of the second application 1204. The system 1200 can combine the objects (e.g., combine the Spock character graphic 1231 with the car object 1232) to generate a composite object (e.g., composite object 1208 of Spock driving a car).

The flow 1000 continues at processing block 1008, where the system presents the one or more composite objects in one or more of the first content and the second content. For example, in FIG. 12, the system 1200 sends the composite object 1208 into the first application's domain. Returning to FIG. 10, in another example, the system can generate and incorporate composite objects into multiple applications, based on a common activity performed by, or attribute shared by, a group of players. For example, if the group of players is playing a secondary group game, the system can send modified assets (i.e., composite objects) back to the base games for all of the players based on the base game's theme. For instance, the system can determine that eight (8) players are playing a secondary group game and generate eight composite objects of characters from the player's primary games, all in cars utilized as competitive vehicles in the secondary game. In some embodiments, the system can generate a different vehicle based on objects from the primary application (e.g., generate Spock character in an Enterprise ship for one player playing a "Star Trek" themed game as their primary application, generate a Harry Callahan character in a police vehicle for a player playing a "Dirty Harry" themed game as their primary application, etc.) and send those distinct composite objects into each of the group player's primary game as a chain of composite objects racing through the primary application. The activity performed by the composite vehicles can be based on the general activity of the second application (e.g., racing, boating, flying, shooting, fighting, etc.). In some embodiments, the system can combine stylistic data for the composite object from its child objects. For example, in FIG. 12, the system can apply stylistic data to the car portion of the composite object 1208 according to a stylistic schema for the second application 1204 (e.g., color the car green), but the Spock character portion of the composite object 1208 can match a stylistic schema for the first application 1202 (e.g., color Spock's outfit blue). In other embodiments, however, the system 1200 can instead apply stylistic data for only the first application 1202 (e.g., apply a metallic spaceship type of skin to the car and make Spock's outfit blue according to first-application stylistic data) or only the second application 1204 (e.g., color the car green and make Spock's outfit a Hawaiian style according to second-application stylistic data).

The flow 1000 continues at processing block 1010, where the system controls interactions between the composite object and one or more other objects. For example, the system can introduce the composite object into the first wagering game application to interact with the first content. In FIG. 12, the system 1200 sends the object into the first application's domain, and the composite object 1208 can interact with the reels 1207 of the first application, or other objects not shown.

The flow 1000 continues at processing block 1012, wherein the system adapts the stylistic appearance of the composite object using stylistic data from the first application. For example, in FIG. 12, the car object 1232 can be the red in color while within the second application's domain, but when the system 1200 sends the composite object 1208 into the first application's domain, the system 1200 can utilize stylistic data from the Star Trek game and change the car on the composite object 1208 to a silver color, or coat it with a metallic plating to appear like a spaceship. In some embodiments, the system 1200 can even modify the car to the theme of the first application 1202 while it is in the first application's domain, such as to change from a car into a space ship (e.g., the Starship Enterprise). The system 1200 can affect the change based on triggers within the first application, such as after a specific event (e.g., after a win).

Additional Example Operating Environments

This section describes example operating environments, systems and networks, and presents structural aspects of some embodiments.

Wagering Game Machine Architecture

Figure 13:
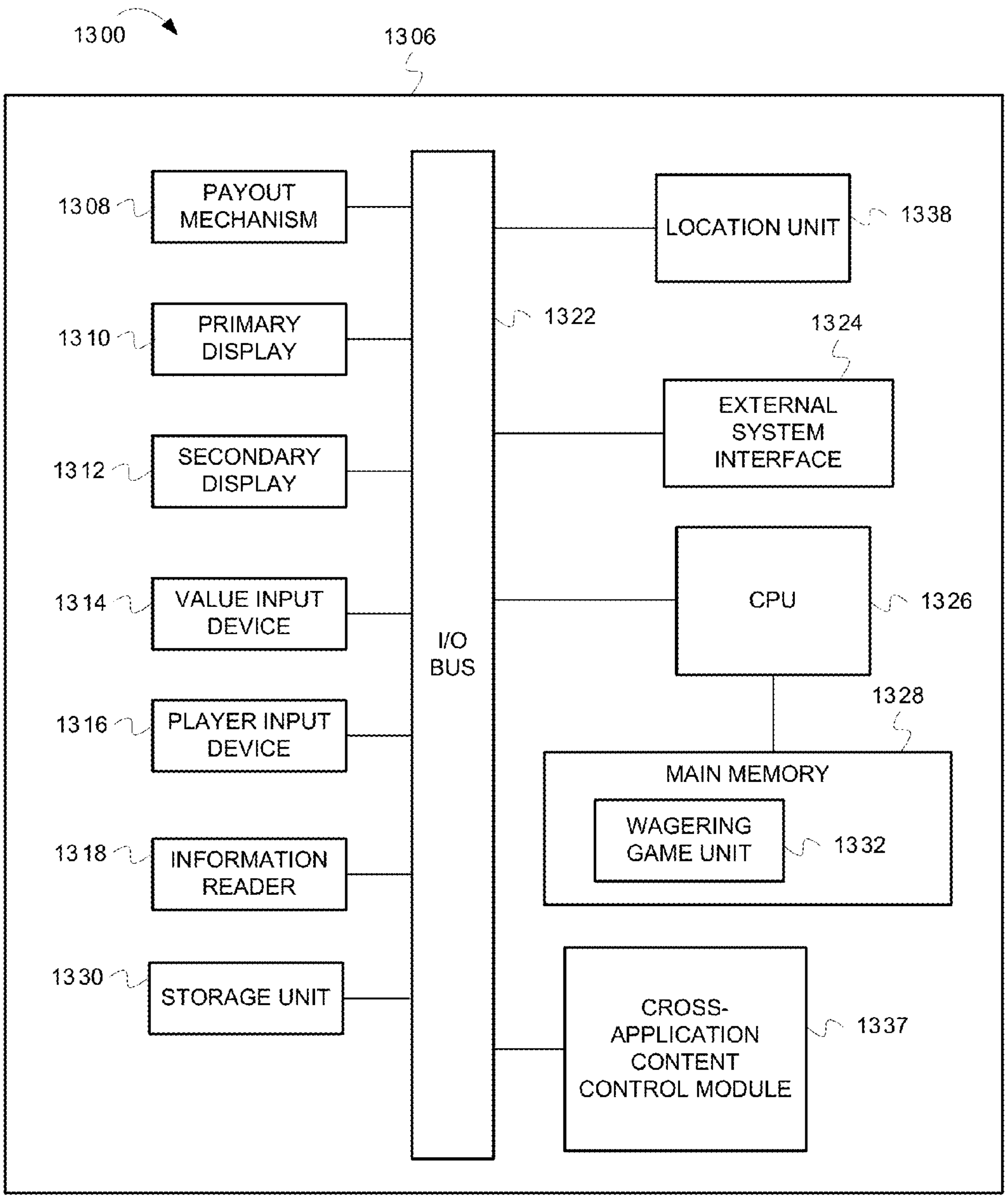
FIG. 13 is an illustration of a wagering game machine architecture 1300, according to some embodiments.

FIG. 13 is a conceptual diagram that illustrates an example of a wagering game machine architecture 1300, according to some embodiments. In FIG. 13, the wagering game machine architecture 1300 includes a wagering game machine 1306, which includes a central processing unit (CPU) 1326 connected to main memory 1328. The CPU 1326 can include any suitable processor, such as an Intel® Pentium processor, Intel® Core 2 Duo processor, AMD Opteron™ processor, or UltraSPARC processor. The main memory 1328 includes a wagering game unit 1332. In some embodiments, the wagering game unit 1332 can present wagering games, such as video poker, video black jack, video slots, video lottery, reel slots, etc., in whole or part.

The CPU 1326 is also connected to an input/output ("I/O") bus 1322, which can include any suitable bus technologies, such as an AGTL+ frontside bus and a PCI backside bus. The I/O bus 1322 is connected to a payout mechanism 1308, primary display 1310, secondary display 1312, value input device 1314, player input device 1316, information reader 1318, and storage unit 1330. The player input device 1316 can include the value input device 1314 to the extent the player input device 1316 is used to place wagers. The I/O bus 1322 is also connected to an external system interface 1324, which is connected to external systems (e.g., wagering game networks). The external system interface 1324 can include logic for exchanging information over wired and wireless networks (e.g., 802.11g transceiver, Bluetooth transceiver, Ethernet transceiver, etc.)

The I/O bus 1322 is also connected to a location unit 1338. The location unit 1338 can create player information that indicates the wagering game machine's location/movements in a casino. In some embodiments, the location unit 1338 includes a global positioning system (GPS) receiver that can determine the wagering game machine's location using GPS satellites. In other embodiments, the location unit 1338 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 13, in some embodiments, the location unit 1338 is not connected to the I/O bus 1322.

In some embodiments, the wagering game machine 1306 can include additional peripheral devices and/or more than one of each component shown in FIG. 13. For example, in some embodiments, the wagering game machine 1306 can include multiple external system interfaces 1324 and/or multiple CPUs 1326. In some embodiments, any of the components can be integrated or subdivided.

In some embodiments, the wagering game machine 1306 includes a cross-application content control module 1337. The cross-application content control module 1337 can process communications, commands, or other information, where the processing can control cross-application wagering game content.

Furthermore, any component of the wagering game machine 1306 can include hardware, firmware, and/or machine-readable media including instructions for performing the operations described herein.

Wagering Game Machine

Figure 14:
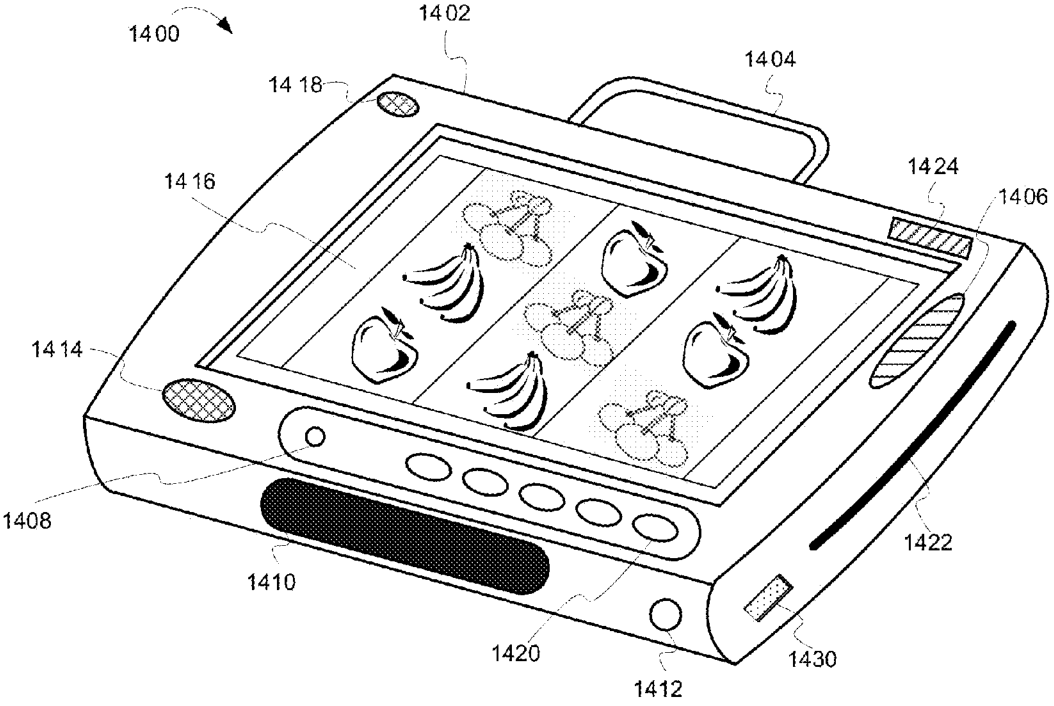
FIG. 14 is an illustration of a wagering game machine 1400, according to some embodiments.

FIG. 14 is a conceptual diagram that illustrates an example of a wagering game machine 1400, according to some embodiments. In FIG. 14, the mobile wagering game machine 1400 includes a housing 1402 for containing internal hardware and/or software such as that described above vis-à-vis FIG. 13. In some embodiments, the housing has a form factor similar to a tablet PC, while other embodiments have different form factors. For example, the mobile wagering game machine 1400 can exhibit smaller form factors, similar to those associated with personal digital assistants. In some embodiments, a handle 1404 is attached to the housing 1402. Additionally, the housing can store a foldout stand 1410, which can hold the mobile wagering game machine 1400 upright or semi-upright on a table or other flat surface.

The mobile wagering game machine 1400 includes several input/output devices. In particular, the mobile wagering game machine 1400 includes buttons 1420, audio jack 1408, speaker 1414, display 1416, biometric device 1406, wireless transmission devices (e.g., wireless communication units 1412 and 1424), microphone 1418, and card reader 1422. Additionally, the mobile wagering game machine can include tilt, orientation, ambient light, or other environmental sensors.

In some embodiments, the mobile wagering game machine 1400 uses the biometric device 1406 for authenticating players, whereas it uses the display 1416 and the speaker 1414 for presenting wagering game results and other information (e.g., credits, progressive jackpots, etc.). The mobile wagering game machine 1400 can also present audio through the audio jack 1408 or through a wireless link such as Bluetooth.

In some embodiments, the wireless communication unit 1412 can include infrared wireless communications technology for receiving wagering game content while docked in a wager gaming station. The wireless communication unit 1424 can include an 802.11G transceiver for connecting to and exchanging information with wireless access points. The wireless communication unit 1424 can include a Bluetooth transceiver for exchanging information with other Bluetooth enabled devices.

In some embodiments, the mobile wagering game machine 1400 is constructed from damage resistant materials, such as polymer plastics. Portions of the mobile wagering game machine 1400 can be constructed from non-porous plastics, which exhibit antimicrobial qualities. Also, the mobile wagering game machine 1400 can be liquid resistant for easy cleaning and sanitization.

In some embodiments, the mobile wagering game machine 1400 can also include an input/output ("I/O") port 1430 for connecting directly to another device, such as to a peripheral device, a secondary mobile machine, etc. Furthermore, any component of the mobile wagering game machine 1400 can include hardware, firmware, and/or machine-readable media including instructions for performing the operations described herein.

The described embodiments can be provided as a computer program product, or software, that can include a machine-readable medium having stored thereon instructions, which can be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium can include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments can be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method comprising:

presenting, by a first wagering game application, first content in a first window on a display device of a wagering game machine, the wagering game machine including a value input device configured to detect a physical item associated with a monetary value that establishes a credit balance, the first content including a first wagering game object;

presenting, by a second wagering game application, second content in a second window on the display device, the second window being distinct from the first window; and moving, by the first wagering game application, the first wagering game object to at least partially overlay the second content in the second window; and transferring control of the first wagering game object from the first wagering game application to the second wagering game application.

2. The method of claim 1, wherein the moving the first wagering game object comprises:

causing the first wagering game object to approach a common boundary that separates the first window and the second window;

determining a trajectory that the first wagering game object follows within the first window on the approach toward the common boundary; and determining a location on the common boundary that the first wagering game object touches while on the trajectory.

3. The method of claim 2, further comprising:

generating a second wagering game object that matches an appearance of the first wagering game object; and presenting, by the second wagering game application in the second window, the second wagering game object in accordance with the trajectory.

4. The method of claim 3, further comprising:

stopping presentation of the first wagering game object within the first window.

5. The method of claim 1, wherein the moving utilizes object data of the first wagering game object.

6. The method of claim 1, wherein the first wagering game application is a primary wagering game and the second wagering game application is a bonus game.

7. The method of claim 5, wherein the object data comprises color data.

8. A wagering game machine comprising:

one or more processors;

a value input device configured to detect a physical item associated with a monetary value that establishes a credit balance;

a display device; and a memory device including instructions which, when executed by at least one of the one or more processors, cause the wagering game machine to perform operations for controlling of a first wagering game object, the instructions including:

instructions to present, in a first window on the display device, first content for a first wagering game application, the first content including a first wagering game object;

instructions to present, in a second window on the display device, second content for a second wagering game application, the second window being distinct from the first window; and instructions to move, by the first wagering game application on the display device, the first wagering game object to at least partially overlay the second content in the second window; and instructions to transfer control of the first wagering game object from the first wagering game application to the second wagering game application.

9. The wagering game machine of claim 8, wherein the instructions to move the first wagering game object to at least partially overly the second content in the second window further include instructions to:

cause the first wagering game object to approach a common boundary that separates the first window and the second window;

determine a trajectory that the first wagering game object follows within the first window on the approach toward the common boundary; and determine a location on the common boundary that the first wagering game object touches while on the trajectory.

10. The wagering game machine of claim 9, wherein the instructions further including:

instructions to generate, a second wagering game object that matches an appearance of the first wagering game object; and instructions to present, by the second wagering game application in the second window, the second wagering game object in accordance with the trajectory.

11. The wagering game machine of claim 10, wherein the instructions further comprise instructions to stop presentation of the first wagering game object within the first window.

12. The wagering game machine of claim 8, wherein the instructions to move the first wagering game object include instructions to overlay the first wagering game object in the second window in accordance with object data of the first wagering game object.

13. The wagering game machine of claim 12, wherein the object data comprises color data.

14. The wagering game machine of claim 8, wherein the first wagering game application is a primary wagering game and the second wagering game application is a bonus game.

15. A non-transitory machine-readable medium having stored thereon instructions that, when executed, cause a wagering game machine having a value input device configured to detect a physical item associated with a monetary value that establishes a credit balance to control a first wagering game object, the instructions comprising:

instructions to present, by a first wagering game application, first content in a first window on a display device of the wagering game machine, the first content including a first wagering game object;

instructions to present, by a second wagering game application, second content in a second window on the display device; and instructions to move, by the first wagering game application, the first wagering game object to at least partially overlay the second content in the second window; and instructions to transfer control of the first wagering game object from the first wagering game application to the second wagering game application.

16. The non-transitory machine-readable medium of claim 15, wherein the instructions to move the first wagering game object further include:

instructions to cause the first wagering game object to approach a common boundary that separates the first window and the second window;

instructions to determine a trajectory that the first wagering game object follows within the first window on the approach toward the common boundary; and instructions to determine a location on the common boundary that the first wagering game object touches while on the trajectory.

17. The non-transitory machine-readable medium of claim 16, wherein the instructions further comprise:

instructions to generate, a second wagering game object that matches an appearance of the first wagering game object; and instructions to present, by the second wagering game application in the second window, the second wagering game object in accordance with the trajectory.

18. The non-transitory machine-readable medium of claim 17, wherein the instructions further comprise instructions to stop presentation of the first wagering game object within the first window.

19. The non-transitory machine-readable medium of claim 15, wherein the instructions to move the first wagering game object utilize object data of the first wagering game object.

20. The non-transitory machine-readable medium of claim 19, wherein the object data comprises color data.

* * * * *